US008966062B1

(12) United States Patent
Giese et al.

(10) Patent No.: US 8,966,062 B1
(45) Date of Patent: Feb. 24, 2015

(54) METHOD AND SYSTEM FOR SYNCHRONIZING USER ACCESS TO INFORMATION PRESENTED IN TWO OR MORE MEDIA FORMATS

(75) Inventors: Jodi Giese, Newbury Park, CA (US); Kevin Upthegrove, Agoura Hills, CA (US)

(73) Assignee: Intuit Inc., Mountain View, CA (US)

( * ) Notice: Subject to any disclaimer, the term of this patent is extended or adjusted under 35 U.S.C. 154(b) by 303 days.

(21) Appl. No.: 13/362,827

(22) Filed: Jan. 31, 2012

(51) Int. Cl.
*G06F 15/173* (2006.01)

(52) U.S. Cl.
USPC ........................................ 709/224; 717/128

(58) Field of Classification Search
USPC .......................................................... 709/224
See application file for complete search history.

(56) References Cited

U.S. PATENT DOCUMENTS

| 5,371,747 | A  | * | 12/1994 | Brooks et al. ................. 714/38.1 |
| 7,017,173 | B1 | * | 3/2006  | Armstrong et al. .............. 725/87 |
| 8,438,485 | B2 | * | 5/2013  | Kulis et al. ..................... 715/727 |
| 2001/0048808 | A1 | * | 12/2001 | Ohta et al. ....................... 386/96 |
| 2009/0240485 | A1 | * | 9/2009  | Dalal et al. ......................... 704/2 |
| 2010/0241963 | A1 | * | 9/2010  | Kulis et al. ..................... 715/727 |
| 2012/0151451 | A1 | * | 6/2012  | Lindahl et al. ................. 717/128 |
| 2013/0019228 | A1 | * | 1/2013  | Bates ............................ 717/129 |

* cited by examiner

*Primary Examiner* — Hua Fan
(74) *Attorney, Agent, or Firm* — Hawley Troxell Ennis & Hawley LLP; Philip McKay

(57) ABSTRACT

Information is generated in two or more media versions and provided to a user through a multi-media monitoring, mapping, and synchronization interface. The user's activity in either media version of the information is then monitored and mapped to the other media version of information and the two media versions are synchronized. Consequently, a user can transfer between two media versions of the same information easily and relatively seamlessly so that the information can be accessed and utilized in either media version efficiently and effectively without significant user action and at the appropriate location in either media version.

19 Claims, 3 Drawing Sheets

METHOD AND SYSTEM FOR SYNCHRONIZING USER ACCESS TO INFORMATION PRESENTED IN TWO OR MORE MEDIA FORMATS

BACKGROUND

Due in large part to significant advances in computing system, memory, and network technology, data and information can now be readily disseminated, and used, in any one of a number of media formats. For instance, information that traditionally would have been distributed as printed text, such as books, is now readily available in both electronic text-based format, to be displayed on various computing systems and/or electronic readers, such as Kindle™, IPad™, and/or IPhone™ systems, and in audio-based formats that can also be played on either the same computing systems and/or electronic readers, or on other systems, such as IPods, or various MP3 players.

There is little question that this wide array of currently available multi-media formats for disseminating information represents a significant advance in information distribution technology, and provides for more varied distribution channels that allow the information to be disseminated to more users, and often in ways that are more relevant to a greater variety of users. However, currently, when information is made available in two or more media formats, such as electronic text-based versions and audio-based versions, each media version is typically designed to be implemented and used in isolation from, and to the mutual exclusion of, the other versions. Consequently, not only is there currently no opportunity for synchronization between the two media versions, but each media version typically requires its own software and/or interface systems, and some even require different playback computing systems.

As an example, currently, if a user desires to listen to an audio book version of a popular novel in her car during her daily commute, but then also wants to read an electronic reader version of the same novel at home, that user must first purchase both the audio-based version of the novel and the electronic text-based version of the novel and make sure her computing system, or computing systems, have the necessary playback software and/or interface installed for each version of the novel.

However, even if the user goes to the significant expense and effort to obtain the two media versions of the novel, there is currently no mechanism for the user to synchronize the two media versions. Consequently, when the user gets home from her daily commute and turns off her audio-book version of the novel at playback point A, she must make an effort to remember the audio content at playback point A, i.e., make a mental bookmark of her place in the audio-based version of the novel. Then, later, when the user desires to relax and pick up her electronic text-based version of the novel, she must recall where she was in the audio-based version, e.g., recall the audio content at playback point A, and then scroll, and/or search, through the electronic text-based version to try to find the electronic text corresponding the audio content at playback point A in the audio-based version. Only then can the user pick up and continue reading in the electronic text-based version of the novel where she left off listening in the audio-based version of the novel.

Clearly the situation described above represents a significant inconvenience to the user. However, to make matters worse, features that are available in one media version of the information are often not available in the other media version. For instance, currently, electronic reader, or e-reader, systems include popular features such as, but not limited to: the ability to activate a dictionary feature to obtain the meaning of a word presented in electronic text-based format; the ability to designate bookmarks and highlight electronic text; and the ability to insert user notes. However, currently, there is typically no similar feature associated with audio books and no mechanism for transferring user input data provided in one media version of the information, such as an electronic text-based version of a book, into another media version of the information, such as an audio-based version of the book. Consequently, the user is limited in his or her ability to fully utilize both media versions of the information.

Given that the consumer/user population is more mobile, and demands more information on demand in every environment, than ever before, the current inability to synchronize and merge activity conducted with one media version of information and activity conducted with another media version of the same information, is extremely limiting and less than ideal for both users of multi-media information and distributers of multi-media information.

What is needed is a method and system for synchronizing activity in two or more media versions of information and allowing the user to make relatively seamless transitions between the two or more media versions of the information.

SUMMARY

In accordance with one embodiment, a method and system for synchronizing activity in two or more media versions of the same information includes a process for synchronizing activity in two or more media versions of the same information whereby, in one embodiment, information is generated in two or more media versions. In one embodiment, the two or more media versions of the information are provided to a user through a multi-media monitoring, mapping, and synchronization interface.

In one embodiment, a user accesses a first media version of the information through the multi-media monitoring, mapping, and synchronization interface. In one embodiment, the user's activity in the first media version of the information is monitored and when the user exits the first media version of the information, user input data indicating an exit location in the first media version of the information where the user discontinued using the first media version of the information is obtained and recorded through the multi-media monitoring, mapping, and synchronization interface.

In one embodiment, the exit location in the first media version of the information is then mapped to a corresponding begin location in the second media version of the information by the multi-media monitoring, mapping, and synchronization interface. In one embodiment, when the user accesses the second media version of the information through the multi-media monitoring, mapping, and synchronization interface, the user is automatically taken to the mapped begin location in the second media version of the information corresponding to the exit location in the first media version of the information where the user discontinued using the first media version of the information.

In one embodiment, the user's activity in the second media version of the information is then monitored and when the user exits the second media version of the information, user input data indicating an exit location in the second media version of the information where the user discontinued using second media version of the information is obtained and recorded through the multi-media monitoring, mapping, and synchronization interface.

In one embodiment, the exit location in the second media version of the information is then mapped to a corresponding new begin location in the first media version of the information by the multi-media monitoring, mapping, and synchronization interface. In one embodiment, when the user again accesses the first media version of the information through the multi-media monitoring, mapping, and synchronization interface, the user is automatically taken to the mapped new begin location in the first media version of the information corresponding to the exit location in the second media version of the information where the user discontinued using the second media version of the information.

In one embodiment, when a user accesses either media version of the information, the user's activity in the that given media version of the information is monitored including, but not limited to, any user input data associated with bookmarks, highlighting, and/or notes, provided in the given media version of the information. In one embodiment, the user input data in the given media version of the information is then transformed into user input data in the other media version of the information by the multi-media monitoring, mapping, and synchronization interface and provided in the other media version of the information at the appropriate location in the other media version of the information.

In one embodiment, the first media version of the information is an electronic text-based version of the information and the second media version of the information is an audio-based version of the information.

In this embodiment, the electronic text-based version of the information and the audio-based version of the information are provided to a user through a multi-media monitoring, mapping, and synchronization interface.

In one embodiment, the user accesses the electronic text-based version of the information through the multi-media monitoring, mapping, and synchronization interface. In one embodiment, the user's activity in the electronic text-based version of the information is monitored and when the user exits the electronic text-based version of the information, the user provides input data in the form of an exit bookmark indicating an exit location in the electronic text-based version of the information where the user discontinued reading. In one embodiment, the exit bookmark location in the electronic text-based version of the information is recorded through the multi-media monitoring, mapping, and synchronization interface.

In one embodiment, the exit bookmark location in the electronic text-based version of the information where the user discontinued using the electronic text-based version of the information is then mapped to a corresponding begin playback location in the audio-based version of the information by the multi-media monitoring, mapping, and synchronization interface. In one embodiment, when the user accesses the audio-based version of the information through the multi-media monitoring, mapping, and synchronization interface, the user is automatically taken to the mapped begin playback location in the audio-based version of the information corresponding to the exit bookmark location in the electronic text-based version of the information where the user discontinued sight reading the electronic text-based version of the information.

In one embodiment, the user's listening/playback activity in the audio-based version of the information is monitored and when the user exits the audio-based version of the information, user input data indicating an end playback location in the audio-based version of the information where the user discontinued listening to the audio-based version of the information is recorded through the multi-media monitoring, mapping, and synchronization interface.

In one embodiment, the end playback location in the audio-based version of the information where the user discontinued listening to the audio-based version of the information is then mapped to a corresponding begin location in the electronic text-based version of the information by the multi-media monitoring, mapping, and synchronization interface. In one embodiment, when the user again accesses the electronic text-based version of the information through the multi-media monitoring, mapping, and synchronization interface, the user is automatically taken to the mapped begin location in the electronic text-based version of the information corresponding to the end playback location in the audio-based version of the information where the user discontinued listening to the audio-based version of the information.

In one embodiment, when a user accesses the electronic text-based version of the information, the user's electronic text-based activity in the electronic text-based version of the information is monitored including, but not limited to, any electronic text-based user input data associated with bookmarks, highlighting and/or notes. In one embodiment, the electronic text-based user input data in the electronic text-based version of the information is then transformed into audio-based user input data by the multi-media monitoring, mapping, and synchronization interface and provided in the audio-based version of the information at the appropriate location in the audio-based version of the information.

In one embodiment, when a user accesses the audio-based version of the information, the user's audio-based activity in the audio-based version of the information is monitored including, but not limited to, any audio-based user input data associated with bookmarks, highlighting and/or notes. In one embodiment, the audio-based user input data in the audio-based version of the information is then transformed into electronic text-based user input data by the multi-media monitoring, mapping, and synchronization interface and provided in the electronic text-based version of the information at the appropriate location in the electronic text-based version of the information.

Using the method and system for synchronizing activity in two or more media versions of the same information discussed herein, a user is provided access to two or more media versions of information through a single multi-media monitoring, mapping, and synchronization interface. The user's activity in any media version of the information is then monitored and mapped to the other media versions of the information and the multiple media versions of the information are synchronized. Consequently using the method and system for synchronizing activity in two or more media versions of the same information discussed herein, a user can transfer between media versions of the same information easily and relatively seamlessly so that the information can be accessed and utilized in either media version efficiently and effectively without significant user action and at the appropriate location in either media version.

Figure 1:
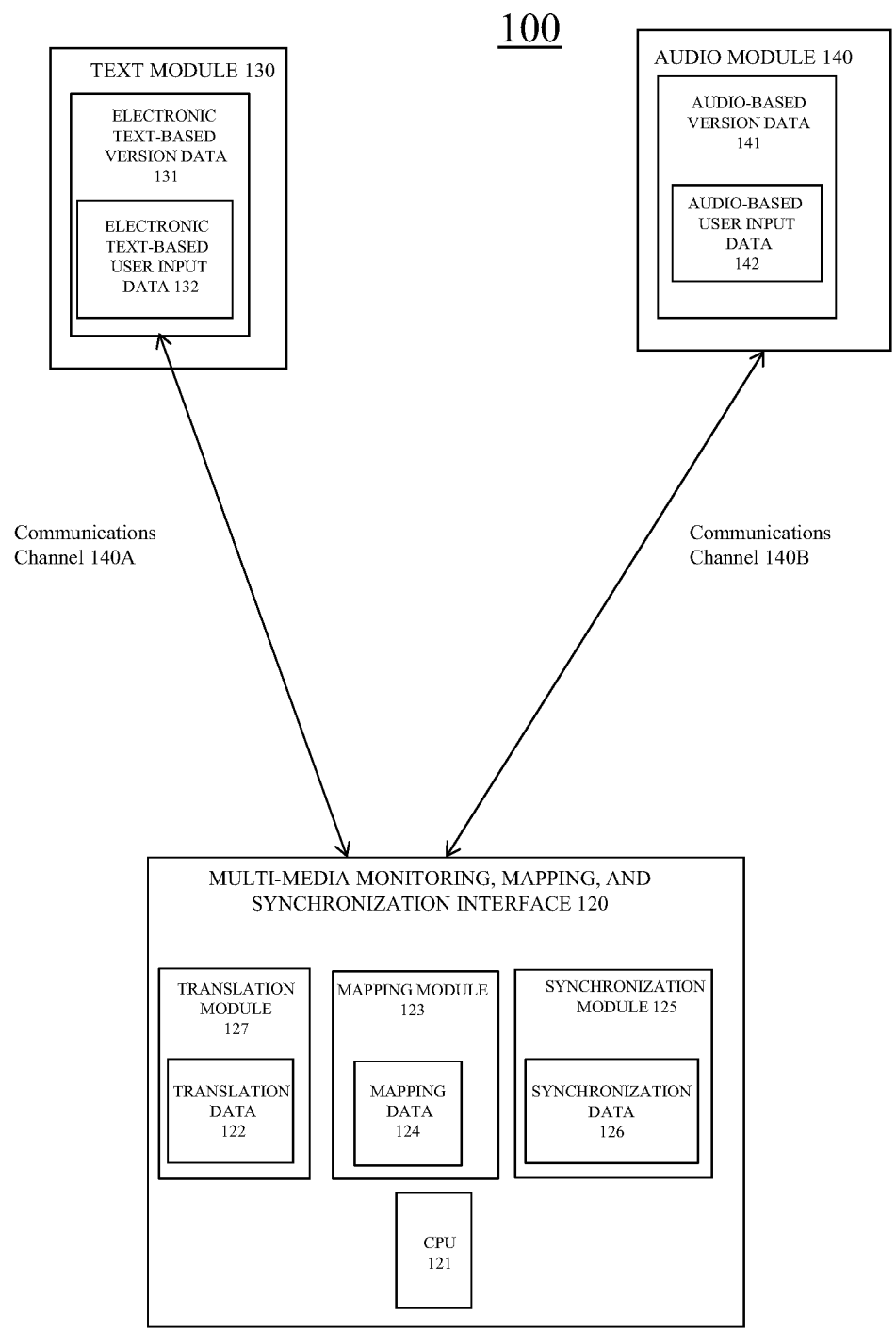
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation, and elements/functions, can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for synchronizing activity in two or more media versions of the same information includes a process for synchronizing activity in two or more media versions of the same information whereby, in one embodiment, information is generated in two or more media versions.

In one embodiment, the information can be any information and/or data desired such as, but not limited to: information traditionally presented in books, text books, manuals, periodicals, newspapers, or any other information that would traditionally be presented in a written, or printed, text format; information traditionally presented as electronic text-based information such as e-books, or any other electronic text-based information; information traditionally presented as audio-based information such as lectures, audio-books, etc.; information traditionally presented as video-based information; and/or any information and/or data presented in any media format as discussed herein, and/or as known in the art at the time of filing, and/or as developed after the time of filing.

In one embodiment, the two or more media versions of the information can be any two media formats of the information desired such as, but not limited to: electronic text-based versions of the information; audio-based versions of the of the information; video-based versions of the information; and/or any other media versions of the information as discussed herein, and/or as known in the art at the time of filing, and/or as developed after the time of filing.

In one embodiment, the two or more media versions of the information are included in a single information data source. In one embodiment, the two or more media versions of the information are included in separate information files or data sources connected through a single multi-media monitoring, mapping, and synchronization interface. In one embodiment, the two or more media versions of the information are included in separate information files or data sources, and on separate computing systems connected through a single multi-media monitoring, mapping, and synchronization interface.

In one embodiment, the two or more media versions of the information are provided to a user through the multi-media monitoring, mapping, and synchronization interface.

In one embodiment, the multi-media monitoring, mapping, and synchronization interface provides access to the two or more media versions of the information and a user's activity and/or actions within the two or more media versions of the information is monitored and/or recorded.

In one embodiment, the multi-media monitoring, mapping, and synchronization interface synchronizes the user's activity and actions in one media version of the information with the other media versions of the information so that whichever media version of the information the user accesses the user is brought to the correct location where the user left off in the last used media version.

In one embodiment, the multi-media monitoring, mapping, and synchronization interface synchronizes the user's activity and actions in one media version of the information with the other media version of the information so that bookmarks, definitions, notes and other user data entered in one media version of the information appear in the appropriate location in the other media version of the information and in the appropriate media format.

In one embodiment, the multi-media monitoring, mapping, and synchronization interface is a system and/or application that is independent of any media version of the information and is not dependent on any specific supporting systems for the use of any media version of the information, such as any specific electronic reader or music library system.

In one embodiment, the multi-media monitoring, mapping, and synchronization interface is implemented on the same computing system as data representing one, or both, of the media versions of the information. In one embodiment, the multi-media monitoring, mapping, and synchronization interface is implemented as a web-based function.

In one embodiment, one or more of the two or more media versions of the information, and/or the multi-media monitoring, mapping, and synchronization interface are part of a cloud-based architecture.

In one embodiment, the user accesses a first media version of the information through the multi-media monitoring, mapping, and synchronization interface. In one embodiment, the user accesses the first media version of the information via a user computing system. In one embodiment, the user accesses the first media version of the information via a user computing system that includes, can access, and/or is associated with, the multi-media monitoring, mapping, and synchronization interface and/or at least one of the two or more media versions of the information.

Herein, the term "computing system" includes, but is not limited to, any computing system known in the art at the time of filing, and/or as developed after the time of filing, such as, but not limited to: a mobile computing system; an electronic reader system; a desktop computing system; a laptop computing system; a notebook computing system; a tablet; an IPod, or other audio/video player; a workstation; a two-way pager; a cellular telephone; a smart phone; a digital wireless telephone; a Personal Digital Assistant (PDA); a server computing system; an Internet appliance, any other device, or any desired combination of these devices, that includes components that can execute all, or part, of a process for synchronizing activity in two or more media versions of the same information in accordance with at least one of the embodiments as discussed herein, and/or as known in the art at the time of filing, and/or as developed after the time of filing.

Herein, the term "mobile computing system" includes, but not limited to: a mobile phone; a smart phone; a tablet; an e-reader; a notebook; an IPod, or other audio/video player; an internet appliance; any Short Message Service (SMS) capable system; or any other mobile computing system as discussed herein, and/or as known in the art at the time of filing, and/or as developed after the time of filing.

In one embodiment, once the user accesses a first media version of the information through the multi-media monitoring, mapping, and synchronization interface, the user performs one or more activities and/or actions within, or through, the first media version of the information.

In one embodiment, the activities and/or actions the user performs within the first media version of the information include, but are not limited to, utilizing the first media version of the information, e.g., sight-reading an electronic text-based version of the information, listening to an audio-based version of the information, watching a video-based version of the information, or any other action whereby the user utilizes the first media version of the information.

In one embodiment, when the user finishes utilizing, and/or accessing, the first media version of the information, an exit location within the first media version of the information where the user exited the first media version of the information, or otherwise stopped utilizing the first media version of the information, is obtained and recorded, in one embodiment, by the multi-media monitoring, mapping, and synchronization interface. In one embodiment, the exit location within the first media version of the information is recorded by the user indicating a bookmark or exit location thru user action such as the user activating a stop, bookmark, or pause feature. In one embodiment, the exit location within the first media version of the information is recorded automatically when the user exits, or otherwise ends access to the first media version of the information, e.g., by determining the playback location when the user ended access. In one embodiment, the exit location within the first media version of the information is determined by any method, means, process or procedure for determining a location within the first media version of the information as discussed herein, and/or as known in the art at the time of filing, and/or as developed after the time of filing.

In one embodiment, the activities and/or actions the user performs within the first media version of the information can also include user data entry actions such as, but not limited to: user entered bookmarks and highlighting in the first media version of the information; user requested and obtained definitions associated with the first media version of the information; user entered notes and/or comments associated with the first media version of the information, or any other user data entry actions as discussed herein, and/or as known in the art at the time of filing, and/or as developed after the time of filing.

In one embodiment, the location within the first media version of the information associated with the activities and/or actions the user performs within the first media version of the information are recorded, in one embodiment, by the multi-media monitoring, mapping, and synchronization interface.

In one embodiment, data indicating the location, or locations, within the first media version of the information associated with the activities and/or actions performed by the user is obtained by the multi-media monitoring, mapping, and synchronization interface. In one embodiment, data indicating the location, or locations, within the first media version of the information associated with the activities and/or actions performed by the user is then mapped to a corresponding location, or locations, within the second media version of the information by the multi-media monitoring, mapping, and synchronization interface.

In one embodiment, the exit location within the first media version of the information where the user exited the first media version of the information is mapped to a corresponding begin location in the second media version of the information by the multi-media monitoring, mapping, and synchronization interface. In this way, when the user accesses the second media version of the information through the multi-media monitoring, mapping, and synchronization interface, the user is automatically taken to the mapped begin location in the second media version of the information corresponding to the exit location in the first media version of the information where the user discontinued using the first media version of the information.

In addition, In one embodiment, data indicating, and/or associated with, the user data entry actions in the first media version of the information is obtained by the multi-media monitoring, mapping, and synchronization interface. In one embodiment, the user data entry actions/data in the first media version of the information are transformed into user data entry actions/data in the second media version of the information. For instance, user notes made verbally in an audio-based version of the information are transformed into electronic text-based notes in an electronic text-based version of the information using a voice recognition system and/or other translation system.

In one embodiment, data indicating the data entry location, or locations, within the first media version of the information associated with the user data entry actions/data in the first media version of the information are also mapped to a corresponding data insert location, or locations, within the second media version of the information by the multi-media monitoring, mapping, and synchronization interface. Consequently, the data indicating and/or associated with the user data entry actions in the first media version of the information is transformed into user data entry actions/data in the second media version of the information using a voice recognition system and/or other translation system and then inserted/entered into the second media version of the information at the appropriate location. For instance, user notes made verbally in an audio-based version of the information directed to chapter 1, paragraph 6, in an audio-based version of a textbook are transformed into electronic text-based notes and inserted at chapter 1, paragraph 6, in an electronic text-based version of the information.

In one embodiment, the user accesses the second media version of the information via a user computing system that includes, can access, and/or is associated with, the multi-media monitoring, mapping, and synchronization interface and/or at least one of the two or more media versions of the information.

In one embodiment, the user accesses the second media version of the information via a user computing system. In one embodiment, the user accesses the second media version of the information via a user computing system that is the same as the user computing system used to access the first media version of the information. In one embodiment, the user accesses the second media version of the information via a user computing system that is different from the user computing system used to access the first media version of the information.

As noted above, by mapping the exit location within the first media version of the information where the user exited the first media version of the information to a corresponding begin location in the second media version of the information, when the user accesses the second media version of the information through the multi-media monitoring, mapping, and synchronization interface, the user is automatically taken to the mapped begin location in the second media version of the information corresponding to the exit location in the first media version of the information where the user discontinued using the first media version of the information.

In one embodiment, once the user accesses the second media version of the information through the multi-media monitoring, mapping, and synchronization interface, the user performs one or more activities and/or actions within, or through, the second media version of the information.

In one embodiment, the activities and/or actions the user performs within the second media version of the information include, but are not limited to, any or all of the activities and/or actions discussed above with respect to the first media version of the information.

In one embodiment, when the user finishes utilizing, and/or accessing, the second media version of the information, the exit location within the second media version of the information where the user exited the second media version of the information, or otherwise stopped utilizing the second media version of the information, is obtained and recorded, in one embodiment, by the multi-media monitoring, mapping, and synchronization interface. In one embodiment, the exit location within the second media version of the information is recorded by the user indicating a bookmark or exit location thru user action such as the user activating a stop, bookmark, or pause feature. In one embodiment, the exit location within the second media version of the information is recorded automatically when the user exits, or otherwise ends access to the second media version of the information, by determining the playback location when the user ended access. In one embodiment, the exit location within the second media version of the information is determined by any method, means, process or procedure for determining a location within the second media version of the information as discussed herein, and/or as known in the art at the time of filing, and/or as developed after the time of filing.

In one embodiment, the activities and/or actions the user performs within the second media version of the information can also include any of the data entry actions discussed above with respect to the first media version of the information.

In one embodiment, the location within the second media version of the information associated with the activities and/or actions the user performs within the second media version of the information are recorded, in one embodiment, by the multi-media monitoring, mapping, and synchronization interface.

In one embodiment, data indicating the location, or locations, within the second media version of the information associated with the activities and/or actions performed by the user is obtained by the multi-media monitoring, mapping, and synchronization interface. In one embodiment, data indicating the location, or locations, within the second media version of the information associated with the activities and/or actions performed by the user is then mapped to a corresponding location, or locations, within the first media version of the information by the multi-media monitoring, mapping, and synchronization interface.

In one embodiment, the exit location within the second media version of the information where the user exited the second media version of the information is mapped to a corresponding new begin location in the first media version of the information by the multi-media monitoring, mapping, and synchronization interface. In this way, when the user accesses the first media version of the information through the multi-media monitoring, mapping, and synchronization interface, the user is automatically taken to the mapped new begin location in the first media version of the information corresponding to the exit location in the second media version of the information where the user discontinued using the second media version of the information.

In addition, In one embodiment, data indicating and/or associated with the user data entry actions in the second media version of the information is obtained by the multi-media monitoring, mapping, and synchronization interface. In one embodiment, the user data entry actions/data in the second media version of the information are transformed into user data entry actions/data in the first media version of the information. For instance, user notes made by electronic text data entry, or other means, in an electronic text-based version of the information are transformed into audio, or voice, notes in an audio-based version of the information.

In one embodiment, data indicating the data input location, or locations, within the second media version of the information associated with the user data entry actions/data in the second media version of the information are also mapped to a corresponding data insert location, or locations, within the first media version of the information by the multi-media monitoring, mapping, and synchronization interface. Consequently, the data indicating and/or associated with the user data entry actions in the second media version of the information is transformed into user data entry actions/data in the first media version of the information and then entered into the first media version of the information at the appropriate location. For instance, user notes made by electronic text data entry, or other means, directed to chapter 1, paragraph 6, in an electronic text-based version of a textbook are transformed into audio-based data and inserted at chapter 1, paragraph 6, in the audio-based version of the information.

In one embodiment, the first media version of the information is an electronic text-based version of the information and the second media version of the information is an audio-based version of the information.

In this embodiment, the electronic text-based version of the information and the audio-based version of the information are provided to a user through a multi-media monitoring, mapping, and synchronization interface.

In one embodiment, the electronic text-based version of the information and the audio-based version of the information are included in a single information data source. In one embodiment, the electronic text-based version of the information and the audio-based version of the information are included in separate information files or data sources connected through a single multi-media monitoring, mapping, and synchronization interface. In one embodiment, the electronic text-based version of the information and the audio-based version of the information are included in separate information files or data sources, and on separate computing systems connected through a single multi-media monitoring, mapping, and synchronization interface.

In one embodiment, the electronic text-based version of the information and the audio-based version of the information are provided to a user through the multi-media monitoring, mapping, and synchronization interface.

In one embodiment, the multi-media monitoring, mapping, and synchronization interface provides access to the electronic text-based version of the information and the audio-based version of the information and a user's activity and/or action within the electronic text-based version of the information and the audio-based version of the information is monitored and/or recorded.

In one embodiment, the multi-media monitoring, mapping, and synchronization interface synchronizes the user's activity and actions in the electronic text-based version of the information with the audio-based version of the information so that whichever media version of the information the user accesses, the user is brought to the correct location where the user left off in the last used media version.

In one embodiment, the multi-media monitoring, mapping, and synchronization interface synchronizes the user's activity and actions in the electronic text-based version of the information with the audio-based version of the information so that bookmarks, definitions, notes and other user data entered in one media version of the information appear in the appropriate location in the other media version of the information.

In one embodiment, the multi-media monitoring, mapping, and synchronization interface is a system and/or application that is independent of the electronic text-based version of the information and the audio-based version of the information and is not dependent on any specific supporting systems for the use of the electronic text-based version of the information and the audio-based version of the information, such as any specific electronic reader or music/audio library system format.

In one embodiment, the multi-media monitoring, mapping, and synchronization interface is implemented on the same computing system as data representing one, or both, of the electronic text-based version of the information and/or the audio-based version of the information. In one embodiment, the multi-media monitoring, mapping, and synchronization interface is implemented as a web-based function.

In one embodiment, any one or more of the electronic text-based version of the information, and/or the audio-based version of the information, and/or the multi-media monitoring, mapping, and synchronization interface are part of a cloud-based architecture.

In one embodiment, the user accesses an electronic text-based version of the information through the multi-media monitoring, mapping, and synchronization interface. In one embodiment, the user accesses the electronic text-based version of the information via a user computing system, such as an e-reader. In one embodiment, the user accesses the electronic text-based version of the information via a user computing system that includes, can access, and/or is associated with, the multi-media monitoring, mapping, and synchronization interface and/or at least one of the electronic text-based version of the information and the audio-based version of the information.

In one embodiment, once the user accesses the electronic text-based version of the information through the multi-media monitoring, mapping, and synchronization interface, the user performs one or more activities and/or actions within, or through, the electronic text-based version of the information.

In one embodiment, the activities and/or actions the user performs within the electronic text-based version of the information include, but are not limited to, utilizing the electronic text-based version of the information, e.g., sight-reading the electronic text-based version of the information, or any other action whereby the user utilizes the electronic text-based version of the information.

In one embodiment, when the user finishes utilizing, and/or accessing, the electronic text-based version of the information, the exit location within the electronic text-based version of the information where the user exits the electronic text-based version of the information, or otherwise stops utilizing the electronic text-based version of the information, is obtained and recorded, in one embodiment, by the multi-media monitoring, mapping, and synchronization interface. In one embodiment, the exit location within the electronic text-based version of the information is recorded by the user indicating a bookmark or exit location thru user action such as the user activating a stop, or bookmark feature or an electronic reader system. In one embodiment, the exit location within the electronic text-based version of the information is determined by any method, means, process or procedure for determining a location within the electronic text-based version of the information as discussed herein, and/or as known in the art at the time of filing, and/or as developed after the time of filing.

In one embodiment, the activities and/or actions the user performs within the electronic text-based version of the information can also include user data entry actions such as, but not limited to: user entered bookmarks and highlighting of the electronic text-based version of the information; user requested and obtained definitions associated with the electronic text-based version of the information; user entered notes and/or comments associated with the electronic text-based version of the information.

In one embodiment, the location within the electronic text-based version of the information associated with the activities and/or actions the user performs within the electronic text-based version of the information are recorded, in one embodiment, by the multi-media monitoring, mapping, and synchronization interface.

In one embodiment, data indicating the location, or locations, within the electronic text-based version of the information associated with the activities and/or actions performed by the user is obtained by the multi-media monitoring, mapping, and synchronization interface. In one embodiment, data indicating the location, or locations, within the electronic text-based version of the information associated with the activities and/or actions performed by the user is then mapped to a corresponding location, or locations, within the audio-based version of the information by the multi-media monitoring, mapping, and synchronization interface.

In one embodiment, the exit location within the electronic text-based version of the information where the user exited the electronic text-based version of the information is mapped to a corresponding begin location in the audio-based version of the information by the multi-media monitoring, mapping, and synchronization interface. In this way, when the user accesses the audio-based version of the information through the multi-media monitoring, mapping, and synchronization interface, the user is automatically taken to the mapped begin location in the audio-based version of the information corresponding to the exit location in the electronic text-based version of the information where the user discontinued using the electronic text-based version of the information.

In addition, in one embodiment, data indicating and/or associated with the user data entry actions in the electronic text-based version of the information is obtained by the multi-media monitoring, mapping, and synchronization interface. In one embodiment, the user data entry actions/data in the electronic text-based version of the information are transformed into user data entry actions/data in the audio-based version of the information using one or more voice recognition systems and/or text/voice translation systems. For instance, user notes made by electronic text data entry, or other means, in an electronic text-based version of the information are transformed into audio, or voice, notes in an audio-based version of the information.

In one embodiment, data indicating the data entry location, or locations, within the electronic text-based version of the information associated with the user data entry actions/data in the electronic text-based version of the information are also mapped to a corresponding data inset location, or locations, within the audio-based version of the information by the multi-media monitoring, mapping, and synchronization interface. Consequently, the data indicating and/or associated with the user data entry actions in the electronic text-based version of the information is transformed into user data entry actions/data in the audio-based version of the information and then inserted/entered into the audio-based version of the information at the appropriate location. For instance, user notes made by electronic text data entry, or other means, directed to chapter 1, paragraph 6, in the electronic text-based version of a textbook are transformed into audio-based data and inserted at a playback location associated with chapter 1, paragraph 6, in the audio-based version of the information.

In one embodiment, the user accesses the audio-based version of the information via a user computing system that includes, can access, and/or is associated with, the multi-media monitoring, mapping, and synchronization interface, and/or at least one of the electronic text-based version of the information and/or the audio-based version of the information.

In one embodiment, the user accesses the audio-based version of the information via a user computing system. In one embodiment, the user accesses the audio-based version of the information via a user computing system that is the same as the user computing system used to access the electronic text-based version of the information. In one embodiment, the user accesses the audio-based version of the information via a user computing system, such as an audio play-back system, e.g., an IPod™, that is different from the user computing system used to access the electronic text-based version of the information, e.g., an electronic reader system.

As noted above, by mapping the exit location within the electronic text-based version of the information where the user exited the electronic text-based version of the information to a corresponding begin location in the audio-based version of the information, when the user accesses the audio-based version of the information through the multi-media monitoring, mapping, and synchronization interface, the user is automatically taken to the mapped begin location in the audio-based version of the information corresponding to the exit location in the electronic text-based version of the information where the user discontinued using the electronic text-based version of the information.

In one embodiment, once the user accesses the audio-based version of the information through the multi-media monitoring, mapping, and synchronization interface, the user performs one or more activities and/or actions within, or through, the audio-based version of the information.

In one embodiment, the activities and/or actions the user performs within the audio-based version of the information include, but are not limited to, listening to, or playing back, a portion of the audio-based version of the information.

In one embodiment, when the user finishes utilizing, and/or accessing, the audio-based version of the information, the exit location within the audio-based version of the information where the user exited the audio-based version of the information, or otherwise stopped utilizing the audio-based version of the information, is obtained and recorded, in one embodiment, by the multi-media monitoring, mapping, and synchronization interface. In one embodiment, the exit location within the audio-based version of the information is recorded by the user indicating a bookmark or exit location thru user action such as the user activating a pause or stop feature. In one embodiment, the exit location within the audio-based version of the information is recorded automatically when the user exits, or otherwise ends access to the audio-based version of the information, by determining the playback location when the user ended access, e.g., when the user turns off the playback computing system. In one embodiment, the exit location within the audio-based version of the information is determined by any method, means, process or procedure for determining a location within the audio-based version of the information, as discussed herein, and/or as known in the art at the time of filing, and/or as developed after the time of filing.

In one embodiment, the activities and/or actions the user performs within the audio-based version of the information can also include any of the data entry actions discussed above with respect to the electronic text-based version of the information.

In one embodiment, the location within the audio-based version of the information associated with the activities and/or actions the user performs within the audio-based version of the information are recorded, in one embodiment, by the multi-media monitoring, mapping, and synchronization interface.

In one embodiment, data indicating the location, or locations, within the audio-based version of the information associated with the activities and/or actions performed by the user is obtained by the multi-media monitoring, mapping, and synchronization interface. In one embodiment, data indicating the location, or locations, within the audio-based version of the information associated with the activities and/or actions performed by the user is then mapped to a corresponding location, or locations, within the electronic text-based version of the information by the multi-media monitoring, mapping, and synchronization interface.

In one embodiment, the exit location within the audio-based version of the information where the user exited the audio-based version of the information is mapped to a corresponding new begin location in the electronic text-based version of the information by the multi-media monitoring, mapping, and synchronization interface. In this way, when the user accesses the electronic text-based version of the information through the multi-media monitoring, mapping, and synchronization interface, the user is automatically taken to the mapped begin location in the electronic text-based version of the information corresponding to the exit location in the audio-based version of the information where the user discontinued using the audio-based version of the information.

In addition, in one embodiment, data indicating, and/or associated with, the user data entry actions in the audio-based version of the information is obtained by the multi-media monitoring, mapping, and synchronization interface. In one embodiment, the user data entry actions/data in the audio-based version of the information are transformed into user data entry actions/data in the electronic text-based version of the information using one or more voice recognition systems and/or text/voice translation systems. For instance, user notes made verbally in an audio-based version of the information are transformed into electronic text-based notes in an electronic text-based version of the information.

In one embodiment, data indicating the data entry location, or locations, within the audio-based version of the information associated with the user data entry actions/data in the audio-based version of the information are also mapped to a corresponding data insert location, or locations, within the electronic text-based version of the information by the multi-media monitoring, mapping, and synchronization interface. Consequently, the data indicating, and/or associated with, the user data entry actions in the audio-based version of the information is transformed into user data entry actions/data in the electronic text-based version of the information and then inserted/entered into the electronic text-based version of the information at the appropriate location. For instance, user notes made verbally in an audio-based version of the information directed to chapter 1, paragraph 6, in an audio-based version of a textbook are transformed into electronic text-based notes and inserted at chapter 1, paragraph 6, in an electronic text-based version of the information.

Hardware System Architecture

FIG. 1 is a block diagram of an exemplary system architecture 100 for implementing one embodiment of a system and method for synchronizing activity in two or more media versions of the same information, such as exemplary processes 200 or 300 discussed herein, that includes: multi-media monitoring, mapping, and synchronization interface 120; text module 130; audio module 140; and communications channels 140A and 140B.

In one embodiment, multi-media monitoring, mapping, and synchronization interface 120 provides access to the two or more media versions of information and a user's activity and/or action within the two or more media versions of the information is monitored and/or recorded.

In one embodiment, the information can be any information and/or data desired such as, but not limited to: information traditionally presented in books, text books, manuals, periodicals, newspapers, or any other information that would traditionally be presented in a written, or printed, text format; information traditionally presented as electronic text-based information such as e-books, or any other electronic text-based information; information traditionally presented as audio-based information such as lectures, audio-books, etc.; information traditionally presented as video-based information; and/or any information and/or data presented in any media format as discussed herein, and/or as known in the art at the time of filing, and/or as developed after the time of filing.

In one embodiment, the two or more media versions of the information can be any two media formats of the information desired such as, but not limited to: electronic text-based versions of the information; audio-based versions of the of the information; video-based versions of the information; and/or any other media versions of the information as discussed herein, and/or as known in the art at the time of filing, and/or as developed after the time of filing.

In the specific illustrative example shown in FIG. 1, the two or more media versions of the information are an electronic text-based version of the information, represented as electronic text-based version data 131, and as provided by text module 130, and an audio-based version of the information, represented as audio-based version data 141, and as provided by audio module 140.

In the specific example of FIG. 1, electronic text-based version data 131 and audio-based version data 141 are provided to a user through multi-media monitoring, mapping, and synchronization interface 120.

In one embodiment, text module 130 with electronic text-based version data 131 and audio module 140 with audio-based version data 141 are included in a single information data source, such as a single file, memory, and/or computing system (not shown in FIG. 1). In one embodiment, text module 130 with electronic text-based version data 131 and audio module 140 with audio-based version data 141 are provided in separate information files, or data sources (not shown in FIG. 1), connected through single multi-media monitoring, mapping, and synchronization interface 120. In one embodiment, text module 130 with electronic text-based version data 131 and audio module 140 with audio-based version data 141 are provided from separate information files or data sources, and on separate computing systems (not shown in FIG. 1) connected through single multi-media monitoring, mapping, and synchronization interface 120.

In one embodiment, multi-media monitoring, mapping, and synchronization interface 120 provides access to text module 130 with electronic text-based version data 131 and audio module 140 with audio-based version data 141 and a user's activity and/or action within text module 130 with electronic text-based version data 131 and audio module 140 with audio-based version data 141 is monitored and/or recorded.

In one embodiment, multi-media monitoring, mapping, and synchronization interface 120 synchronizes the user's activity and actions in text module 130 with electronic text-based version data 131 and audio module 140 with audio-based version data 141 so that whichever one of text module 130 with electronic text-based version data 131 or audio module 140 with audio-based version data 141 media version of the information the user accesses, the user is brought to the correct location where the user left off in the last used media version.

In one embodiment, multi-media monitoring, mapping, and synchronization interface 120 synchronizes the user's activity and actions in text module 130 and/or electronic text-based version data 131 with audio module 140 and/or audio-based version data 141 so that bookmarks, definitions, notes and other user data entered in one of text module 130 with electronic text-based version data 131 or audio module 140 with audio-based version data 141 appear in the appropriate location in the other of audio module 140 with audio-based version data 141 or text module 130 with electronic text-based version data 131.

In one embodiment, multi-media monitoring, mapping, and synchronization interface 120 is a system and/or application that is independent of text module 130 with electronic text-based version data 131 or audio module 140 with audio-based version data 141 and is not dependent on any specific supporting systems for the use of text module 130 with electronic text-based version data 131 or audio module 140 with audio-based version data 141, such as any specific electronic reader or music/audio library system format.

In one embodiment, multi-media monitoring, mapping, and synchronization interface 120 is implemented on the same computing system (not shown) as text module 130 with electronic text-based version data 131 and/or audio module 140 with audio-based version data 141. In one embodiment, multi-media monitoring, mapping, and synchronization interface 120 is implemented as a web-based function.

In one embodiment, any one or more of text module 130 with electronic text-based version data 131 or audio module 140 with audio-based version data 141, and/or multi-media monitoring, mapping, and synchronization interface 120 are part of a cloud-based architecture.

As seen in FIG. 1, multi-media monitoring, mapping, and synchronization interface 120 includes CPU 121; translation module 127; mapping module 123; and synchronization module 125.

As discussed below, translation module 127 includes translation data 122 that includes data and instructions for translating electronic text-based user input data 132 in text module 130 into audio-based user input data 142 in audio module 140 and/or translating audio-based user input data 142 in audio module 140 into electronic text-based user input data 132 in text module 130.

As discussed below, mapping module 123 includes mapping data 124 that includes data and instructions for mapping a location in audio-based version data 141 to a corresponding location in electronic text-based version data 131 and/or mapping a location in electronic text-based version data 131 to a corresponding location audio-based version data 141.

As discussed below, synchronization module 125 includes synchronization data 126 that includes data and instructions for synchronizing all changes in data in electronic text-based version data 131 with audio-based version data 141 and all changes in data in audio-based version data 141 with electronic text-based version data 131.

In operation, in one embodiment, a user accesses text module 130 and/or electronic text-based version data 131 through multi-media monitoring, mapping, and synchronization interface 120. In one embodiment, the user's activity associated with text module 130 and/or electronic text-based version data 131 is monitored and when the user exits text module 130 and/or electronic text-based version data 131, the user provides input data, shown as electronic text-based user input data 132 in FIG. 1, in the form of an exit bookmark indicating an exit location in electronic text-based version data 131 where the user discontinued reading. In one embodiment, the exit bookmark location in electronic text-based version data 131 is as part of recorded synchronization data 126 of synchronization module 125 through multi-media monitoring, mapping, and synchronization interface 120.

In one embodiment, the bookmark location in electronic text-based version data 131 where the user discontinued using text module 130 and/or electronic text-based version data 131 is then mapped to a corresponding begin playback location in audio-based version data 141 by mapping module 123 and multi-media monitoring, mapping, and synchronization interface 120.

In one embodiment, when the user accesses audio module 140 and/or audio-based version data 141 through multi-media monitoring, mapping, and synchronization interface 120, the user is automatically taken to the mapped begin playback location in audio-based version data 141 corresponding to the exit bookmark location in electronic text-based version data 131 where the user discontinued sight reading in electronic text-based version data 131 by synchronization module 125.

In one embodiment, the user's listening/playback activity in audio module 140 and/or audio-based version data 141 is monitored and when the user exits audio module 140 and/or audio-based version data 141, user input data indicating an end playback location in audio-based version data 141 where the user discontinued listening to audio-based version data 141 is recorded as part of synchronization data 126 of synchronization module 125 in multi-media monitoring, mapping, and synchronization interface 120.

In one embodiment, the end playback location in audio-based version data 141 where the user discontinued listening to audio-based version data 141 is then mapped by mapping module 123 of multi-media monitoring to a corresponding begin location in electronic text-based version data 131. In one embodiment, when the user again accesses text module 130 and/or electronic text-based version data 131 through multi-media monitoring, mapping, and synchronization interface 120, the user is automatically taken to the mapped begin location in electronic text-based version data 131 corresponding to the end playback location in audio-based version data 141 where the user discontinued listening to audio-based version data 141 by synchronization module 125.

In one embodiment, when a user accesses text module 130 and/or electronic text-based version data 131, the user's electronic text-based activity in text module 130 and/or electronic text-based version data 131 is monitored including, but not limited to, any electronic text-based user input data associated with bookmarks, highlighting and/or notes. In one embodiment, the electronic text-based user input data in text module 130 and/or electronic text-based version data 131, represented as electronic text-based user input data 132 in FIG. 1, is then transformed by translation module 127 under the direction of CPU 121 of multi-media monitoring, mapping, and synchronization interface 120, into audio-based user input data, shown as audio-based user input data 142 in FIG. 1, and provided in audio module 140 and/or audio-based version data 141 at the appropriate location in audio module 140 and/or audio-based version data 141.

In one embodiment, when a user accesses audio module 140 and/or audio-based version data 141, the user's audio-based activity in audio module 140 and/or audio-based version data 141 is monitored including, but not limited to, any audio-based user input data, shown as audio-based user input data 142 in FIG. 1, associated with bookmarks, highlighting and/or notes. In one embodiment, audio-based user input data 142 in audio module 140 and/or audio-based version data 141 is then transformed by translation module 122 of multi-media monitoring, mapping, and synchronization interface 120 into electronic text-based user input data, shown as electronic text-based user input data 132 in FIG. 1, by multi-media monitoring, mapping, and synchronization interface 120 and provided in text module 130 and/or electronic text-based version data 131 at the appropriate location in text module 130 and/or electronic text-based version data 131.

In one embodiment, multi-media monitoring, mapping, and synchronization interface 120, text module 130, and audio module 140, are linked by communications channels 140A and 140B. In one embodiment, one, or both, of communications links 140A and 140B can be, but is not limited to: a mobile communication link, such as a mobile phone link; a land-line phone link; a cable-based communications link; a satellite communications link; the Internet, or other network communications link; and/or any other communications link, or combination of communications links, as discussed herein, and/or as known in the art at the time of filing, and/or as developed after the time of filing.

In one embodiment, communications links 140A and 140B include any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Although a process for synchronizing activity in two or more media versions of the same information, such as process for synchronizing activity in two or more media versions of the same information 200, is sometimes referred to herein, alternatively, as a process, an application, a module, a program, a component of a software system, a component of a software package, a component of a parent system, a plug-in, or a feature of a parent system, this terminology is illustrative only. In some embodiments, a process for synchronizing activity in two or more media versions of the same information, such as process for synchronizing activity in two or more media versions of the same information 200, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPU 121.

In one embodiment, a process for synchronizing activity in two or more media versions of the same information, such as process for synchronizing activity in two or more media versions of the same information 200, is a computer application or process implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system. However, in some embodiments, the medium also may be removable and/or remote from the computing system.
Process In accordance with one embodiment, a method and system for synchronizing activity in two or more media versions of the same information includes a process for synchronizing activity in two or more media versions of the same information whereby, in one embodiment, information is generated in two or more media versions. In one embodiment, the two or more media versions of the information are provided to a user through a multi-media monitoring, mapping, and synchronization interface.

In one embodiment, a user accesses a first media version of the information through the multi-media monitoring, mapping, and synchronization interface. In one embodiment, the user's activity in the first media version of the information is monitored and when the user exits the first media version of the information, user input data indicating an exit location in the first media version of the information where the user discontinued using the first media version of the information is obtained and recorded through the multi-media monitoring, mapping, and synchronization interface.

In one embodiment, the exit location in the first media version of the information is then mapped to a corresponding begin location in the second media version of the information by the multi-media monitoring, mapping, and synchronization interface. In one embodiment, when the user accesses the second media version of the information through the multi-media monitoring, mapping, and synchronization interface, the user is automatically taken to the mapped begin location in the second media version of the information corresponding to the exit location in the first media version of the information where the user discontinued using the first media version of the information.

In one embodiment, the user's activity in the second media version of the information is then monitored and when the user exits the second media version of the information, user input data indicating an exit location in the second media version of the information where the user discontinued using second media version of the information is obtained and recorded through the multi-media monitoring, mapping, and synchronization interface.

In one embodiment, the exit location in the second media version of the information is then mapped to a corresponding new begin location in the first media version of the information by the multi-media monitoring, mapping, and synchronization interface. In one embodiment, when the user again accesses the first media version of the information through the multi-media monitoring, mapping, and synchronization interface, the user is automatically taken to the mapped new begin location in the first media version of the information corresponding to the exit location in the second media version of the information where the user discontinued using the second media version of the information.

In one embodiment, when a user accesses either media version of the information, the user's activity in the that given media version of the information is monitored including, but not limited to, any user input data associated with bookmarks, highlighting, and/or notes, provided in the given media version of the information. In one embodiment, the user input data in the given media version of the information is then transformed into user input data in the other media version of the information by the multi-media monitoring, mapping, and synchronization interface and provided in the other media version of the information at the appropriate location in the other media version of the information.

Figure 2:
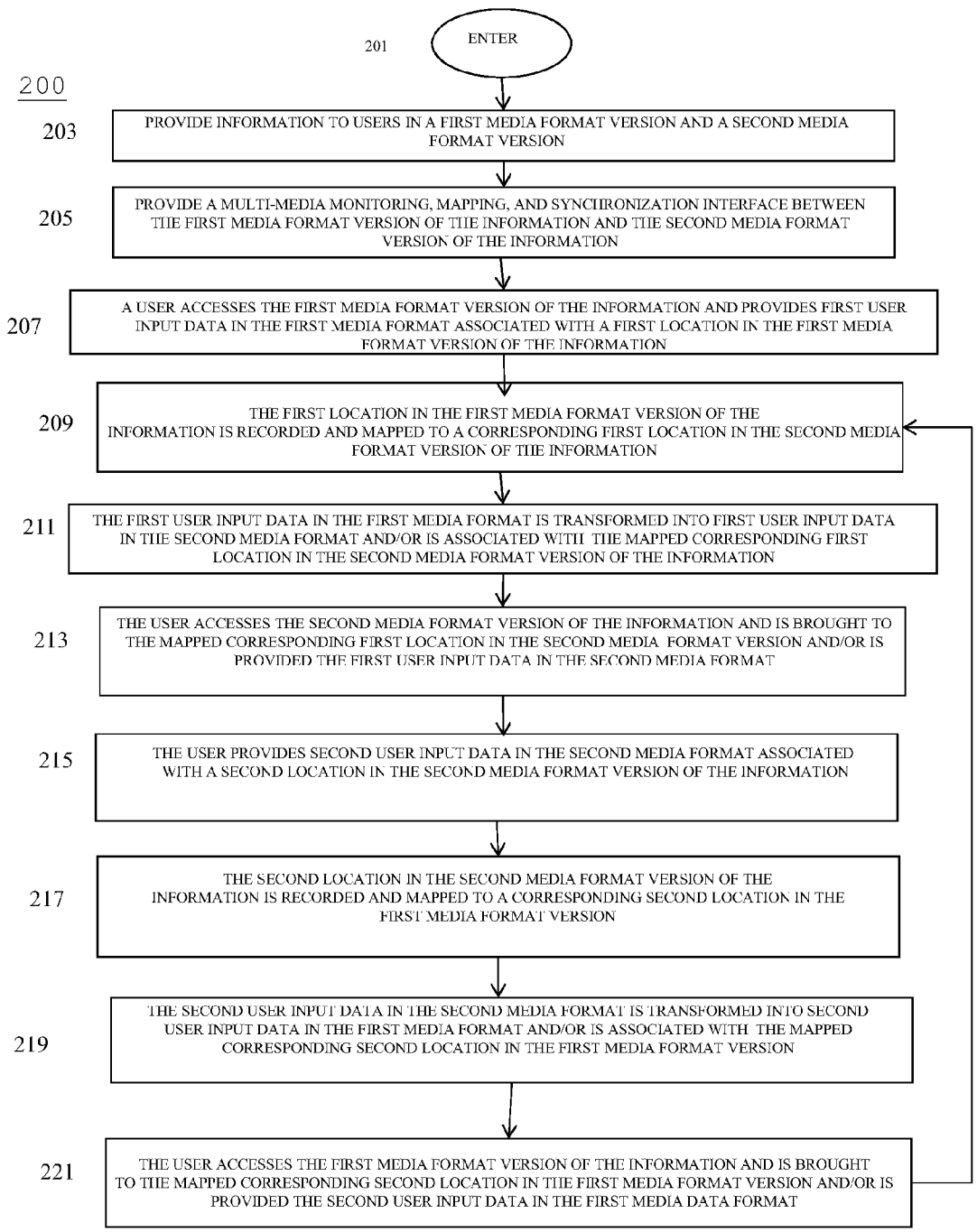
FIG. 2 is a flow chart depicting a process for synchronizing activity in two or more media versions of the same information in accordance with one embodiment.

FIG. 2 a flow chart depicting a process for synchronizing activity in two or more media versions of the same information 200 in accordance with one embodiment. Process for synchronizing activity in two or more media versions of the same information 200 begins at ENTER OPERATION 201 of FIG. 2 and process flow proceeds to PROVIDE INFORMATION TO USERS IN A FIRST MEDIA FORMAT VERSION AND A SECOND MEDIA FORMAT VERSION OPERATION 203.

In one embodiment, at PROVIDE INFORMATION TO USERS IN A FIRST MEDIA FORMAT VERSION AND A SECOND MEDIA FORMAT VERSION OPERATION 203 information is generated in two or more media versions.

In various embodiments, the information of PROVIDE INFORMATION TO USERS IN A FIRST MEDIA FORMAT VERSION AND A SECOND MEDIA FORMAT VERSION OPERATION 203 can be any information and/or data desired such as, but not limited to: information traditionally presented in books, text books, manuals, periodicals, newspapers, or any other information that would traditionally be presented in a written, or printed, text format; information traditionally presented as electronic text-based information such as e-books, or any other electronic text-based information; information traditionally presented as audio-based information such as lectures, audio-books, etc.; information traditionally presented as video-based information; and/or any information and/or data presented in any media format as discussed herein, and/or as known in the art at the time of filing, and/or as developed after the time of filing.

In various embodiments, the two or more media versions of the information of PROVIDE INFORMATION TO USERS IN A FIRST MEDIA FORMAT VERSION AND A SECOND MEDIA FORMAT VERSION OPERATION 203 can be any two media formats of the information desired such as, but not limited to: electronic text-based versions of the information; audio-based versions of the of the information; video-based versions of the information; and/or any other media versions of the information as discussed herein, and/or as known in the art at the time of filing, and/or as developed/made available after the time of filing.

In one embodiment, the two or more media versions of the information of PROVIDE INFORMATION TO USERS IN A FIRST MEDIA FORMAT VERSION AND A SECOND MEDIA FORMAT VERSION OPERATION 203 are included in a single information data source. In one embodiment, the two or more media versions of the information of PROVIDE INFORMATION TO USERS IN A FIRST MEDIA FORMAT VERSION AND A SECOND MEDIA FORMAT VERSION OPERATION 203 are included in separate information files or data sources connected through a single multi-media monitoring, mapping, and synchronization interface. In one embodiment, the two or more media versions of the information of PROVIDE INFORMATION TO USERS IN A FIRST MEDIA FORMAT VERSION AND A SECOND MEDIA FORMAT VERSION OPERATION 203 are included in separate information files or data sources, and on separate computing systems connected through a single multi-media monitoring, mapping, and synchronization interface.

In one embodiment, once information is generated in two or more media versions at PROVIDE INFORMATION TO USERS IN A FIRST MEDIA FORMAT VERSION AND A SECOND MEDIA FORMAT VERSION OPERATION 203, process flow proceeds to PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305.

In one embodiment, at PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 the two or more media versions of the information of PROVIDE INFORMATION TO USERS IN A FIRST MEDIA FORMAT VERSION AND A SECOND MEDIA FORMAT VERSION OPERATION 203 are provided to a user through a multi-media monitoring, mapping, and synchronization interface.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 provides access to the two or more media versions of the information and a user's activity and/or actions within the two or more media versions of the information is monitored and/or recorded.

As discussed below, in one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 synchronizes the user's activity and actions in one media version of the information with the other media versions of the information so that whichever media version of the information the user accesses, the user is brought to the correct location where the user left off in the last used media version.

As also discussed below, in one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 synchronizes the user's activity and actions in one media version of the information with the other media version of the information so that bookmarks, definitions, notes and other user data entered in one media version of the information appear in the appropriate location in the other media version of the information and in the appropriate media format.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 is a system and/or application that is independent of any media version of the information and is not dependent on any specific supporting systems for the use of any media version of the information, such as any specific electronic reader or music library system.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 is implemented on the same computing system as data representing one, or both, of the media versions of the information.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 is implemented as a web-based function.

In one embodiment, one or more of the two or more media versions of the information of PROVIDE INFORMATION TO USERS IN A FIRST MEDIA FORMAT VERSION AND A SECOND MEDIA FORMAT VERSION OPERATION 203, and/or the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 are part of a cloud-based architecture.

In one embodiment, once the two or more media versions of the information of PROVIDE INFORMATION TO USERS IN A FIRST MEDIA FORMAT VERSION AND A SECOND MEDIA FORMAT VERSION OPERATION 203 are provided to a user through a multi-media monitoring, mapping, and synchronization interface at PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 process flow proceeds to A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 a user accesses a first media version of the information through the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 and the user's activity in the first media version of the information is monitored.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 the user accesses the first media version of the information via a user computing system.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 the user accesses the first media version of the information via a user computing system that includes, can access, and/or is associated with, the multi-media monitoring, mapping, and synchronization interface and/or at least one of the two or more media versions of the information.

Herein, the term "computing system" includes, but is not limited to, any computing system known in the art at the time of filing, and/or as developed after the time of filing, such as, but not limited to: a mobile computing system; an electronic reader system; a desktop computing system; a laptop computing system; a notebook computing system; a tablet; an IPod, or other audio/video player; a workstation; a two-way pager; a cellular telephone; a smart phone; a digital wireless telephone; a Personal Digital Assistant (PDA); a server computing system; an Internet appliance, any other device, or any desired combination of these devices, that includes components that can execute all, or part, of a process for synchronizing activity in two or more media versions of the same information in accordance with at least one of the embodiments as discussed herein, and/or as known in the art at the time of filing, and/or as developed after the time of filing.

Herein, the term "mobile computing system" includes, but not limited to: a mobile phone; a smart phone; a tablet; an e-reader; a notebook; an IPod, or other audio/video player; an internet appliance; any Short Message Service (SMS) capable system; or any other mobile computing system as discussed herein, and/or as known in the art at the time of filing, and/or as developed after the time of filing.

In one embodiment, once the user accesses a first media version of the information through the multi-media monitoring, mapping, and synchronization interface, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207, the user performs one or more activities and/or actions within, or through, the first media version of the information.

In one embodiment, the activities and/or actions the user performs within the first media version of the information at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 include, but are not limited to, utilizing the first media version of the information, e.g., sight-reading an electronic text-based version of the information, listening to an audio-based version of the information, watching a video-based version of the information, or any other action whereby the user utilizes the first media version of the information.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 when the user finishes utilizing, and/or accessing, the first media version of the information, an exit location within the first media version of the information where the user exited the first media version of the information, or otherwise stopped utilizing the first media version of the information, is obtained and recorded, in one embodiment, by the multi-media monitoring, mapping, and synchronization interface.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 the exit location within the first media version of the information is recorded by the user indicating a bookmark or exit location thru user action such as the user activating a stop, bookmark, or pause feature.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 the exit location within the first media version of the information is recorded automatically when the user exits, or otherwise ends access to the first media version of the information, e.g., by determining the playback location when the user ended access.

In one embodiment, the exit location within the first media version of the information is determined at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 by any method, means, process or procedure for determining a location within the first media version of the information as discussed herein, and/or as known in the art at the time of filing, and/or as developed after the time of filing.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 the activities and/or actions the user performs within the first media version of the information can also include user data entry actions such as, but not limited to: user entered bookmarks and highlighting in the first media version of the information; user requested and obtained definitions associated with the first media version of the information; user entered notes and/or comments associated with the first media version of the information, or any other user data entry actions as discussed herein, and/or as known in the art at the time of filing, and/or as developed after the time of filing.

In one embodiment, at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 the location within the first media version of the information associated with the activities and/or actions the user performs within the first media version of the information are recorded, in one embodiment, by the multi-media monitoring, mapping, and synchronization interface.

In one embodiment, once a user accesses a first media version of the information through the multi-media monitoring, mapping, and synchronization interface and the user's activity in the first media version of the information is monitored at A USER ACCESSES THE FIRST MEDIA FORMAT VERSION OF THE INFORMATION AND PRO- VIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207, process flow proceeds to THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209.

In one embodiment, at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209 data indicating the location, or locations, within the first media version of the information associated with the activities and/or actions performed by the user at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 are mapped to a corresponding location, or locations, within the second media version of the information by the multi-media monitoring, mapping, and synchronization interface.

In one embodiment, at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209 the exit location within the first media version of the information where the user exited the first media version of the information is mapped to a corresponding begin location in the second media version of the information by the multi-media monitoring, mapping, and synchronization interface. As discussed below, in this way, when the user accesses the second media version of the information through the multi-media monitoring, mapping, and synchronization interface, the user is automatically taken to the mapped begin location in the second media version of the information corresponding to the exit location in the first media version of the information where the user discontinued using the first media version of the information.

In addition, in one embodiment, at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209 data indicating the data entry location, or locations, within the first media version of the information associated with the user data entry actions/data in the first media version of the information are also mapped to a corresponding data insert location, or locations, within the second media version of the information by the multi-media monitoring, mapping, and synchronization interface.

In one embodiment, once data indicating the location, or locations, within the first media version of the information associated with the activities and/or actions performed by the user at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 are mapped to a corresponding location, or locations, within the second media version of the information by the multi-media monitoring, mapping, and synchronization interface at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209, process flow proceeds to THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211.

In one embodiment, at THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211 data indicating, and/or associated with, the user data entry actions in the first media version of the information of A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 is obtained by the multi-media monitoring, mapping, and synchronization interface and transformed into user data entry actions/data in the second media version of the information.

For instance, as an illustrative example, user notes made verbally in an audio-based version of the information at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 are transformed into electronic text-based notes in an electronic text-based version of the information using a voice recognition system and/or other translation system at THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211.

As noted above, in one embodiment, at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209, data indicating the data entry location, or locations, within the first media version of the information associated with the user data entry actions/data in the first media version of the information made at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 are mapped to a corresponding data insert location, or locations, within the second media version of the information by the multi-media monitoring, mapping, and synchronization interface. Consequently, at THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211 the data indicating and/or associated with the user data entry actions in the first media version of the information is transformed into user data entry actions/data in the second media version of the information using a voice recognition system and/or other translation system and then inserted/entered into the second media version of the information at the appropriate location.

For instance, as one illustrative example, at THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211 user notes made verbally in an audio-based version of the information at A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 directed to chapter 1, paragraph 6, in an audio-based version of a textbook are transformed into electronic text-based notes and inserted at chapter 1, paragraph 6, in an electronic text-based version of the information at THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211.

In one embodiment, once data indicating, and/or associated with, the user data entry actions in the first media version of the information of A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 is obtained by the multi-media monitoring, mapping, and synchronization interface and transformed into user data entry actions/data in the second media version of the information at THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211, process flow proceeds to THE USER ACCESSES THE SECOND MEDIA FORMAT VERSION OF THE INFORMATION AND IS BROUGHT TO THE MAPPED CORRESPONDING FIRST LOCATION IN THE SECOND MEDIA FORMAT VERSION AND/OR IS PROVIDED THE FIRST USER INPUT DATA IN THE SECOND MEDIA FORMAT OPERATION 213.

In one embodiment, at THE USER ACCESSES THE SECOND MEDIA FORMAT VERSION OF THE INFORMATION AND IS BROUGHT TO THE MAPPED CORRESPONDING FIRST LOCATION IN THE SECOND MEDIA FORMAT VERSION AND/OR IS PROVIDED THE FIRST USER INPUT DATA IN THE SECOND MEDIA FORMAT OPERATION 213 the user accesses the second media version of the information of PROVIDE INFORMATION TO USERS IN A FIRST MEDIA FORMAT VERSION AND A SECOND MEDIA FORMAT VERSION OPERATION 203 and is automatically sent to the begin location in the second media version of the information corresponding to the exit location within the first media version of the information where the user exited the first media version of the information.

In one embodiment, at THE USER ACCESSES THE SECOND MEDIA FORMAT VERSION OF THE INFORMATION AND IS BROUGHT TO THE MAPPED CORRESPONDING FIRST LOCATION IN THE SECOND MEDIA FORMAT VERSION AND/OR IS PROVIDED THE FIRST USER INPUT DATA IN THE SECOND MEDIA FORMAT OPERATION 213 the user accesses the second media version of the information of PROVIDE INFORMATION TO USERS IN A FIRST MEDIA FORMAT VERSION AND A SECOND MEDIA FORMAT VERSION OPERATION 203 via a user computing system that includes, can access, and/or is associated with, the multi-media monitoring, mapping, and synchronization interface and/or at least one of the two or more media versions of the information.

In one embodiment, at THE USER ACCESSES THE SECOND MEDIA FORMAT VERSION OF THE INFORMATION AND IS BROUGHT TO THE MAPPED CORRESPONDING FIRST LOCATION IN THE SECOND MEDIA FORMAT VERSION AND/OR IS PROVIDED THE FIRST USER INPUT DATA IN THE SECOND MEDIA FORMAT OPERATION 213 the user accesses the second media version of the information via a user computing system that is the same as the user computing system used to access the first media version of the information.

In one embodiment, at THE USER ACCESSES THE SECOND MEDIA FORMAT VERSION OF THE INFORMATION AND IS BROUGHT TO THE MAPPED CORRESPONDING FIRST LOCATION IN THE SECOND MEDIA FORMAT VERSION AND/OR IS PROVIDED THE FIRST USER INPUT DATA IN THE SECOND MEDIA FORMAT OPERATION 213 the user accesses the second media version of the information via a user computing system that is different from the user computing system used to access the first media version of the information.

As noted above, by mapping the exit location within the first media version of the information where the user exited the first media version of the information to a corresponding begin location in the second media version of the information at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209, when the user accesses the second media version of the information through the multi-media monitoring, mapping, and synchronization interface, at THE USER ACCESSES THE SECOND MEDIA FORMAT VERSION OF THE INFORMATION AND IS BROUGHT TO THE MAPPED CORRESPONDING FIRST LOCATION IN THE SECOND MEDIA FORMAT VERSION AND/OR IS PROVIDED THE FIRST USER INPUT DATA IN THE SECOND MEDIA FORMAT OPERATION 213, the user is automatically taken to the mapped begin location in the second media version of the information corresponding to the exit location in the first media version of the information where the user discontinued using the first media version of the information.

In one embodiment, once the user accesses the second media version of the information of PROVIDE INFORMATION TO USERS IN A FIRST MEDIA FORMAT VERSION AND A SECOND MEDIA FORMAT VERSION OPERATION 203 and is automatically sent to the begin location in the second media version of the information corresponding to the exit location within the first media version of the information where the user exited the first media version of the information at THE USER ACCESSES THE SECOND MEDIA FORMAT VERSION OF THE INFORMATION AND IS BROUGHT TO THE MAPPED CORRESPONDING FIRST LOCATION IN THE SECOND MEDIA FORMAT VERSION AND/OR IS PROVIDED THE FIRST USER INPUT DATA IN THE SECOND MEDIA FORMAT OPERATION 213, process flow proceeds to THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215.

In one embodiment, at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 the user performs one or more activities and/or actions within, or through, the second media version of the information of PROVIDE INFORMATION TO USERS IN A FIRST MEDIA FORMAT VERSION AND A SECOND MEDIA FORMAT VERSION OPERATION 203.

In one embodiment, the activities and/or actions the user performs within the second media version of the information at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 include, but are not limited to, any or all of the activities and/or actions discussed above with respect to A USER ACCESSES THE FIRST MEDIA FORMAT VERSION OF THE INFORMATION AND PROVIDES FIRST USER INPUT DATA IN THE FIRST MEDIA FORMAT ASSOCIATED WITH A FIRST LOCATION IN THE FIRST MEDIA FORMAT VERSION OF THE INFORMATION OPERATION 207 and the first media version of the information.

In one embodiment, at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 when the user finishes utilizing, and/or accessing, the second media version of the information, the exit location within the second media version of the information where the user exited the second media version of the information, or otherwise stopped utilizing the second media version of the information, is obtained and recorded, in one embodiment, by the multi-media monitoring, mapping, and synchronization interface.

In one embodiment, at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 the exit location within the second media version of the information is recorded by the user indicating a bookmark or exit location thru user action such as the user activating a stop, bookmark, or pause feature.

In one embodiment, at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 the exit location within the second media version of the information is recorded automatically when the user exits, or otherwise ends access to the second media version of the information, by determining the playback location when the user ended access.

In one embodiment, at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 the exit location within the second media version of the information is determined by any method, means, process or procedure for determining a location within the second media version of the information as discussed herein, and/or as known in the art at the time of filing, and/or as developed after the time of filing.

In one embodiment, at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215, the activities and/or actions the user performs within the second media version of the information can also include any of the data entry actions discussed above with respect to the first media version of the information.

In one embodiment, at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 the location within the second media version of the information associated with the activities and/or actions the user performs within the second media version of the information are recorded, in one embodiment, by the multi-media monitoring, mapping, and synchronization interface.

In one embodiment, once the user performs one or more activities and/or actions within, or through, the second media version of the information of PROVIDE INFORMATION TO USERS IN A FIRST MEDIA FORMAT VERSION AND A SECOND MEDIA FORMAT VERSION OPERATION 203 at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215, process flow proceeds to THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217.

In one embodiment, at THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217 data indicating the location, or locations, within the second media version of the information associated with the activities and/or actions performed by the user are obtained by the multi-media monitoring, mapping, and synchronization interface and mapped to a corresponding location, or locations, within the first media version of the information by the multi-media monitoring, mapping, and synchronization interface.

In one embodiment, at THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217 the exit location within the second media version of the information where the user exited the second media version of the information is mapped to a corresponding new begin location in the first media version of the information by the multi-media monitoring, mapping, and synchronization interface. As discussed below, in this way, when the user accesses the first media version of the information through the multi-media monitoring, mapping, and synchronization interface, the user is automatically taken to the mapped new begin location in the first media version of the information corresponding to the exit location in the second media version of the information where the user discontinued using the second media version of the information.

In addition, in one embodiment, at THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217 data indicating and/or associated with the user data entry actions in the second media version of the information is obtained by the multi-media monitoring, mapping, and synchronization interface.

In one embodiment, once data indicating the location, or locations, within the second media version of the information associated with the activities and/or actions performed by the user obtained by the multi-media monitoring, mapping, and synchronization interface and mapped to a corresponding location, or locations, within the first media version of the information by the multi-media monitoring, mapping, and synchronization interface at THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217 process flow proceeds to THE SECOND USER INPUT DATA IN THE SECOND MEDIA FORMAT IS TRANSFORMED INTO SECOND USER INPUT DATA IN THE FIRST MEDIA FORMAT AND/OR IS ASSOCIATED WITH THE MAPPED CORRESPONDING SECOND LOCATION IN THE FIRST MEDIA FORMAT VERSION OPERATION 219.

In one embodiment, at THE SECOND USER INPUT DATA IN THE SECOND MEDIA FORMAT IS TRANSFORMED INTO SECOND USER INPUT DATA IN THE FIRST MEDIA FORMAT AND/OR IS ASSOCIATED WITH THE MAPPED CORRESPONDING SECOND LOCATION IN THE FIRST MEDIA FORMAT VERSION OPERATION 219 the user data entry actions/data in the second media version of the information of THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 are transformed into user data entry actions/data in the first media version of the information.

For instance, user notes made by electronic text data entry, or other means, in an electronic text-based version of the information at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 are transformed into audio, or voice, notes in an audio-based version of the information at THE SECOND USER INPUT DATA IN THE SECOND MEDIA FORMAT IS TRANSFORMED INTO SECOND USER INPUT DATA IN THE FIRST MEDIA FORMAT AND/OR IS ASSOCIATED WITH THE MAPPED CORRESPONDING SECOND LOCATION IN THE FIRST MEDIA FORMAT VERSION OPERATION 219.

As noted above, in one embodiment, at THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217 data indicating the data input location, or locations, within the second media version of the information associated with the user data entry actions/data in the second media version of the information are mapped to a corresponding data insert location, or locations, within the first media version of the information by the multi-media monitoring, mapping, and synchronization interface. Consequently, the data indicating and/or associated with the user data entry actions in the second media version of the information is transformed into user data entry actions/data in the first media version of the information and then entered into the first media version of the information at the appropriate location at THE SECOND USER INPUT DATA IN THE SECOND MEDIA FORMAT IS TRANSFORMED INTO SECOND USER INPUT DATA IN THE FIRST MEDIA FORMAT AND/OR IS ASSOCIATED WITH THE MAPPED CORRESPONDING SECOND LOCATION IN THE FIRST MEDIA FORMAT VERSION OPERATION 219.

For instance, user notes made by electronic text data entry, or other means, directed to chapter 1, paragraph 6, in an electronic text-based version of a textbook at THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 are transformed into audio-based data and inserted at chapter 1, paragraph 6, in the audio-based version of the information at THE SECOND USER INPUT DATA IN THE SECOND MEDIA FORMAT IS TRANSFORMED INTO SECOND USER INPUT DATA IN THE FIRST MEDIA FORMAT AND/OR IS ASSOCIATED WITH THE MAPPED CORRESPONDING SECOND LOCATION IN THE FIRST MEDIA FORMAT VERSION OPERATION 219.

In one embodiment, once the user data entry actions/data in the second media version of the information of THE USER PROVIDES SECOND USER INPUT DATA IN THE SECOND MEDIA FORMAT ASSOCIATED WITH A SECOND LOCATION IN THE SECOND MEDIA FORMAT VERSION OF THE INFORMATION OPERATION 215 are transformed into user data entry actions/data in the first media version of the information at THE SECOND USER INPUT DATA IN THE SECOND MEDIA FORMAT IS TRANSFORMED INTO SECOND USER INPUT DATA IN THE FIRST MEDIA FORMAT AND/OR IS ASSOCIATED WITH THE MAPPED CORRESPONDING SECOND LOCATION IN THE FIRST MEDIA FORMAT VERSION OPERATION 219, process flow proceeds to THE USER ACCESSES THE FIRST MEDIA FORMAT VERSION OF THE INFORMATION AND IS BROUGHT TO THE MAPPED CORRESPONDING SECOND LOCATION IN THE FIRST MEDIA FORMAT VERSION AND/OR IS PROVIDED THE SECOND USER INPUT DATA IN THE FIRST MEDIA DATA FORMAT OPERATION 221.

In one embodiment, at THE USER ACCESSES THE FIRST MEDIA FORMAT VERSION OF THE INFORMATION AND IS BROUGHT TO THE MAPPED CORRESPONDING SECOND LOCATION IN THE FIRST MEDIA FORMAT VERSION AND/OR IS PROVIDED THE SECOND USER INPUT DATA IN THE FIRST MEDIA DATA FORMAT OPERATION 221 the user returns to the first media version of the information of PROVIDE INFORMATION TO USERS IN A FIRST MEDIA FORMAT VERSION AND A SECOND MEDIA FORMAT VERSION OPERATION 203 and is automatically sent to the begin location in the first media version of the information corresponding to the exit location within the second media version of the information where the user exited the second media version of the information.

In various embodiments, the process described above is repeated each time a user accesses either the first media version or the second media version of the information.

As noted above, by mapping the exit location within a given media version of the information where the user exited the given media version of the information to a corresponding begin location in the other media version of the information at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209 or THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217, when the user accesses either media version of the information through the multi-media monitoring, mapping, and synchronization interface, the user is automatically taken to the mapped begin location in that media version of the information corresponding to the exit location in the other media version of the information last used.

In addition, in one embodiment, data indicating the data input location, or locations, within either media version of the information associated with the user data entry actions/data in either media version of the information are mapped to corresponding data insert location, or locations, within either media version of the information by at THE FIRST LOCATION IN THE FIRST MEDIA FORMAT VERSION OF THE INFORMATION IS RECORDED AND MAPPED TO A CORRESPONDING FIRST LOCATION IN THE SECOND MEDIA FORMAT VERSION OF THE INFORMATION OPERATION 209 and/or THE SECOND LOCATION IN THE SECOND MEDIA FORMAT VERSION OF THE INFORMATION IS RECORDED AND MAPPED TO A CORRESPONDING SECOND LOCATION IN THE FIRST MEDIA FORMAT VERSION OPERATION 217 and transformed into both media version formats at THE FIRST USER INPUT DATA IN THE FIRST MEDIA FORMAT IS TRANSFORMED INTO FIRST USER INPUT DATA IN THE SECOND MEDIA FORMAT AND/OR ASSOCIATED WITH THE MAPPED CORRESPONDING FIRST LOCATION IN THE SECOND MEDIA FORMAT VERSION OF THE INFORMATION OPERATION 211 and/or THE SECOND USER INPUT DATA IN THE SECOND MEDIA FORMAT IS TRANSFORMED INTO SECOND USER INPUT DATA IN THE FIRST MEDIA FORMAT AND/OR IS ASSOCIATED WITH THE MAPPED CORRESPONDING SECOND LOCATION IN THE FIRST MEDIA FORMAT VERSION OPERATION 219.

Consequently, the data indicating and/or associated with the user data entry actions in either media version of the information is transformed into user data entry actions/data in the other media version of the information and then entered into the other media version of the information at the appropriate location.

Using process for synchronizing activity in two or more media versions of the same information 200, a user is provided access to two or more media versions of information through a single multi-media monitoring, mapping, and synchronization interface. The user's activity in either media version of the information is then monitored and mapped to the other media version of information and the two media versions are synchronized. Consequently using process for synchronizing activity in two or more media versions of the same information 200, a user can transfer between two media versions of the same information easily and relatively seamlessly so that the information can be accessed and utilized in either media version efficiently and effectively without significant user action and at the appropriate location in either media version.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

In one embodiment, the first media version of the information is an electronic text-based version of the information and the second media version of the information is an audio-based version of the information.

In this embodiment, the electronic text-based version of the information and the audio-based version of the information are provided to a user through a multi-media monitoring, mapping, and synchronization interface.

In one embodiment, the user accesses the electronic text-based version of the information through the multi-media monitoring, mapping, and synchronization interface. In one embodiment, the user's activity in the electronic text-based version of the information is monitored and when the user exits the electronic text-based version of the information, the user provides input data in the form of an exit bookmark indicating an exit location in the electronic text-based version of the information where the user discontinued reading. In one embodiment, the bookmark location in the electronic text-based version of the information is recorded through the multi-media monitoring, mapping, and synchronization interface.

In one embodiment, the bookmark location in the electronic text-based version of the information where the user discontinued using the electronic text-based version of the information is then mapped to a corresponding begin playback location in the audio-based version of the information by the multi-media monitoring, mapping, and synchronization interface. In one embodiment, when the user accesses the audio-based version of the information through the multi-media monitoring, mapping, and synchronization interface, the user is automatically taken to the mapped begin playback location in the audio-based version of the information corresponding to the exit bookmark location in the electronic text-based version of the information where the user discontinued sight reading the electronic text-based version of the information.

In one embodiment, the user's listening/playback activity in the audio-based version of the information is monitored and when the user exits the audio-based version of the information, user input data indicating an end playback location in the audio-based version of the information where the user discontinued listening to the audio-based version of the information is recorded through the multi-media monitoring, mapping, and synchronization interface.

In one embodiment, the end playback location in the audio-based version of the information where the user discontinued listening to the audio-based version of the information is then mapped to a corresponding begin location in the electronic text-based version of the information by the multi-media monitoring, mapping, and synchronization interface. In one embodiment, when the user again accesses the electronic text-based version of the information through the multi-media monitoring, mapping, and synchronization interface, the user is automatically taken to the mapped begin location in the electronic text-based version of the information corresponding to the end playback location in the audio-based version of the information where the user discontinued listening to the audio-based version of the information.

In one embodiment, when a user accesses the electronic text-based version of the information, the user's electronic text-based activity in the electronic text-based version of the information is monitored including, but not limited to, any electronic text-based user input data associated with bookmarks, highlighting and/or notes. In one embodiment, the electronic text-based user input data in the electronic text-based version of the information is then transformed into audio-based user input data by the multi-media monitoring, mapping, and synchronization interface and provided in the audio-based version of the information at the appropriate location in the audio-based version of the information.

In one embodiment, when a user accesses the audio-based version of the information, the user's audio-based activity in the audio-based version of the information is monitored including, but not limited to, any audio-based user input data associated with bookmarks, highlighting and/or notes. In one embodiment, the audio-based user input data in the audio-based version of the information is then transformed into electronic text-based user input data by the multi-media monitoring, mapping, and synchronization interface and provided in the electronic text-based version of the information at the appropriate location in the electronic text-based version of the information.

Figure 3:
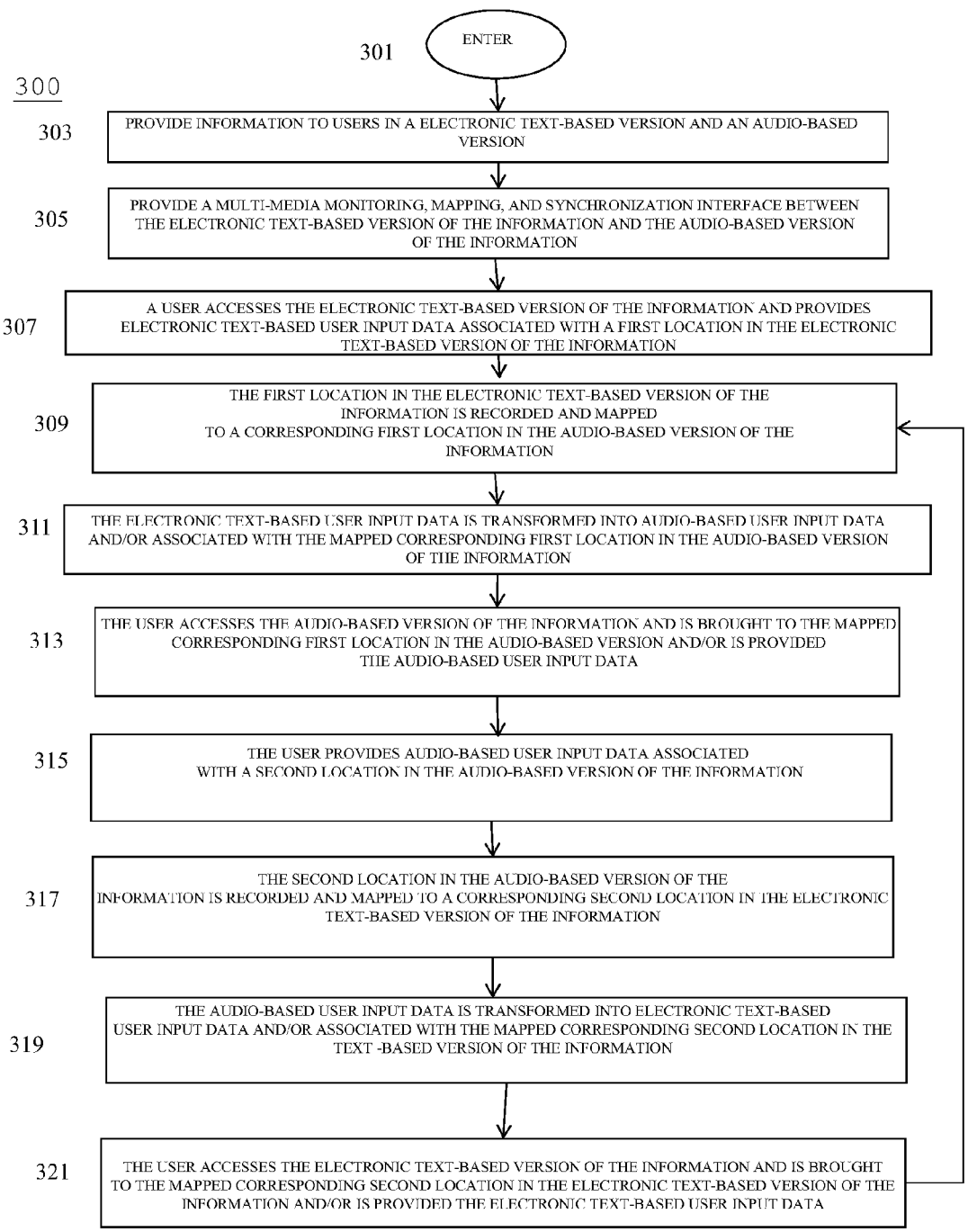
FIG. 3 is a flow chart depicting a process for synchronizing activity in electronic text-based and audio-based versions of the same information in accordance with one embodiment.

FIG. 3 a flow chart depicting a process for synchronizing activity in electronic text-based and audio-based versions of the same information 300 in accordance with one embodiment. Process for synchronizing activity in electronic text-based and audio-based versions of the same information 300 begins at ENTER OPERATION 301 of FIG. 3 and process flow proceeds to PROVIDE INFORMATION TO USERS IN AN ELECTRONIC TEXT-BASED VERSION AND AN AUDIO-BASED VERSION OPERATION 303.

In one embodiment, at PROVIDE INFORMATION TO USERS IN AN ELECTRONIC TEXT-BASED VERSION AND AN AUDIO-BASED VERSION OPERATION 303 information is generated in an electronic text-based version and an audio-based version.

In various embodiments, the information of PROVIDE INFORMATION TO USERS IN AN ELECTRONIC TEXT-BASED VERSION AND AN AUDIO-BASED VERSION OPERATION 303 can be any information and/or data desired such as, but not limited to: information traditionally presented in books, text books, manuals, periodicals, newspapers, or any other information that would traditionally be presented in a written, or printed, text format; information traditionally presented as electronic text-based information such as e-books, or any other electronic text-based information; information traditionally presented as audio-based information such as lectures, audio-books, etc.; information traditionally presented as video-based information; and/or any information and/or data presented in any media format as discussed herein, and/or as known in the art at the time of filing, and/or as developed after the time of filing.

In one embodiment, the electronic text-based version of the information and the audio-based version of the information of PROVIDE INFORMATION TO USERS IN AN ELECTRONIC TEXT-BASED VERSION AND AN AUDIO-BASED VERSION OPERATION 303 are included in a single information data source. In one embodiment, the electronic text-based version of the information and the audio-based version of the information of PROVIDE INFORMATION TO USERS IN AN ELECTRONIC TEXT-BASED VERSION AND AN AUDIO-BASED VERSION OPERATION 303 are included in separate information files or data sources connected through a single multi-media monitoring, mapping, and synchronization interface. In one embodiment, the electronic text-based version of the information and the audio-based version of the information of PROVIDE INFORMATION TO USERS IN AN ELECTRONIC TEXT-BASED VERSION AND AN AUDIO-BASED VERSION OPERATION 303 are included in separate information files or data sources, and on separate computing systems, such as an e-reader system and an audio playback system, connected through a single multi-media monitoring, mapping, and synchronization interface.

In one embodiment, once information is generated an electronic text-based version of the information and an audio-based version of the information at PROVIDE INFORMATION TO USERS IN AN ELECTRONIC TEXT-BASED VERSION AND AN AUDIO-BASED VERSION OPERATION 303, process flow proceeds to PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305.

In one embodiment, at PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 the electronic text-based version of the information and the audio-based version of the information of PROVIDE INFORMATION TO USERS IN AN ELECTRONIC TEXT-BASED VERSION AND AN AUDIO-BASED VERSION OPERATION 303 are provided to a user through a multi-media monitoring, mapping, and synchronization interface.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 provides access to the electronic text-based version of the information and the audio-based version of the information and a user's activity and/or actions within either the electronic text-based version of the information or the audio-based version of the information is monitored and/or recorded.

As discussed below, in one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 synchronizes the user's activity and actions in both the electronic text-based version of the information and the audio-based version of the information so that whichever media version of the information the user accesses, the user is brought to the correct location where the user left off in the last used media version.

As also discussed below, in one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 synchronizes the user's activity and actions in either the electronic text-based version of the information or the audio-based version of the information so that bookmarks, definitions, notes and other user data entered in one media version of the information appear in the appropriate location in the other media version of the information and in the appropriate media format.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 is a system and/or application that is independent of either the electronic text-based version of the information or the audio-based version of the information and is not dependent on any specific supporting systems for the use of either the electronic text-based version of the information or the audio-based version of the information, such as any specific electronic reader or music library system.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 is implemented on the same computing system as data representing one, or both, of the electronic text-based version of the information and/or the audio-based version of the information.

In one embodiment, the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 is implemented as a web-based function.

In one embodiment, one or more of the electronic text-based version of the information and the audio-based version of the information of PROVIDE INFORMATION TO USERS IN AN ELECTRONIC TEXT-BASED VERSION AND AN AUDIO-BASED VERSION OPERATION 303, and/or the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 are part of a cloud-based architecture.

In one embodiment, once the electronic text-based version of the information and the audio-based version of the information of PROVIDE INFORMATION TO USERS IN AN ELECTRONIC TEXT-BASED VERSION AND AN AUDIO-BASED VERSION OPERATION 303 are provided to a user through a multi-media monitoring, mapping, and synchronization interface at PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 process flow proceeds to A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 a user accesses the electronic text-based version of the information through the multi-media monitoring, mapping, and synchronization interface of PROVIDE A MULTI-MEDIA MONITORING, MAPPING, AND SYNCHRONIZATION INTERFACE BETWEEN THE ELECTRONIC TEXT-BASED VERSION OF THE INFORMATION AND THE AUDIO-BASED VERSION OF THE INFORMATION OPERATION 305 and the user's activity in the electronic text-based version of the information is monitored.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 the user accesses the electronic text-based version of the information via a user computing system.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 the user accesses the electronic text-based version of the information via a user computing system that includes, can access, and/or is associated with, the multi-media monitoring, mapping, and synchronization interface.

In one embodiment, once the user accesses the electronic text-based version of the information through the multi-media monitoring, mapping, and synchronization interface, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307, the user performs one or more activities and/or actions within, or through, the electronic text-based version of the information.

In one embodiment, the activities and/or actions the user performs within the electronic text-based version of the information at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 include, but are not limited to, utilizing the electronic text-based version of the information, e.g., sight-reading the electronic text-based version of the information, or any other action whereby the user utilizes the electronic text-based version of the information.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VER- SION OF THE INFORMATION OPERATION 307 when the user finishes utilizing, and/or accessing, the electronic text-based version of the information, an exit location within the electronic text-based version of the information where the user exited the electronic text-based version of the information, or otherwise stopped utilizing the electronic text-based version of the information, is obtained and recorded, in one embodiment, by the multi-media monitoring, mapping, and synchronization interface.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 the exit location within the electronic text-based version of the information is recorded by the user indicating an exit bookmark or exit location thru user action such as the user activating a stop, bookmark, or pause feature within a user commuting system, e.g., an electronic reader system such as a Kindle™.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 the exit location within the electronic text-based version of the information is recorded automatically when the user exits, or otherwise ends access to the electronic text-based version of the information.

In one embodiment, the exit bookmark or exit location within the electronic text-based version of the information is determined at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 by any method, means, process or procedure for determining a location within the electronic text-based version of the information as discussed herein, and/or as known in the art at the time of filing, and/or as developed after the time of filing.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 the activities and/or actions the user performs within the electronic text-based version of the information can also include user data entry actions such as, but not limited to: user entered bookmarks and highlighting in the electronic text-based version of the information; user requested and obtained definitions associated with the electronic text-based version of the information; user entered notes and/or comments associated with the electronic text-based version of the information, or any other user data entry actions as discussed herein, and/or as known in the art at the time of filing, and/or as developed after the time of filing.

In one embodiment, at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 the location within the electronic text-based version of the information associated with the activities and/or actions the user performs within the electronic text-based version of the information are recorded, in one embodiment, by the multi-media monitoring, mapping, and synchronization interface.

In one embodiment, once a user accesses the electronic text-based version of the information through the multi-media monitoring, mapping, and synchronization interface and the user's activity in the electronic text-based version of the information is monitored at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307, process flow proceeds to THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309.

In one embodiment, at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309 data indicating the location, or locations, within the electronic text-based version of the information associated with the activities and/or actions performed by the user at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 are mapped to a corresponding location, or locations, within the audio-based version of the information by the multi-media monitoring, mapping, and synchronization interface.

In one embodiment, at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309 the exit bookmark or location within the electronic text-based version of the information where the user exited the electronic text-based version of the information is mapped to a corresponding begin playback location in the audio-based version of the information by the multi-media monitoring, mapping, and synchronization interface. As discussed below, in this way, when the user accesses the audio-based version of the information through the multi-media monitoring, mapping, and synchronization interface, the user is automatically taken to the mapped begin playback location in the audio-based version of the information corresponding to the exit bookmark or exit location in the electronic text-based version of the information where the user discontinued using the electronic text-based version of the information.

In addition, in one embodiment, at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309 data indicating the data entry location, or locations, within the electronic text-based version of the information associated with the user data entry actions/data in the electronic text-based version of the information are also mapped to a corresponding data insert location, or locations, within the audio-based version of the information by the multi-media monitoring, mapping, and synchronization interface.

In one embodiment, once data indicating the location, or locations, within the electronic text-based version of the information associated with the activities and/or actions performed by the user at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 are mapped to a corresponding location, or locations, within the audio-based version of the information by the multi-media monitoring, mapping, and synchronization interface at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309, process flow proceeds to THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311.

In one embodiment, at THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311 data indicating, and/or associated with, the user data entry actions in the electronic text-based version of the information of A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 is obtained by the multi-media monitoring, mapping, and synchronization interface and transformed into user data entry actions/data in the audio-based version of the information.

For instance, as an illustrative example, user notes made via electronic text-based input in the electronic text-based version of the information at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 are transformed into audio-based notes in the audio-based version of the information using a voice recognition system and/or other translation system at THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311.

As noted above, in one embodiment, at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309, data indicating the data entry location, or locations, within the electronic text-based version of the information associated with the user data entry actions/data in the electronic text-based version of the information made at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 are mapped to a corresponding data insert location, or locations, within the audio-based version of the information by the multi-media monitoring, mapping, and synchronization interface. Consequently, in one embodiment, at THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311 the data indicating and/or associated with the user data entry actions in the electronic text-based version of the information is transformed into user data entry actions/data in the audio-based version of the information using a voice recognition system and/or other translation system, and then inserted/entered into the audio-based version of the information at the appropriate location.

For instance, as one illustrative example, at THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311 user electronic text-based notes made at A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 directed to chapter 1, paragraph 6, in an electronic text-based version of a textbook are transformed into audio-based notes and inserted at chapter 1, paragraph 6, in an audio-based version of the information at THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311.

In one embodiment, once data indicating, and/or associated with, the user data entry actions in the electronic text-based version of the information of A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 is obtained by the multi-media monitoring, mapping, and synchronization interface and transformed into user data entry actions/data in the audio-based version of the information at THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311, process flow proceeds to THE USER ACCESSES THE AUDIO-BASED VERSION OF THE INFORMATION AND IS BROUGHT TO THE MAPPED CORRESPONDING FIRST LOCATION IN THE AUDIO-BASED VERSION AND/OR IS PROVIDED THE AUDIO-BASED USER INPUT DATA OPERATION 313.

In one embodiment, at THE USER ACCESSES THE AUDIO-BASED VERSION OF THE INFORMATION AND IS BROUGHT TO THE MAPPED CORRESPONDING FIRST LOCATION IN THE AUDIO-BASED VERSION AND/OR IS PROVIDED THE AUDIO-BASED USER INPUT DATA OPERATION 313 the user accesses the audio-based version of the information of PROVIDE INFORMATION TO USERS IN AN ELECTRONIC TEXT-BASED VERSION AND AN AUDIO-BASED VERSION OPERATION 303 and is automatically sent to the begin playback location in the audio-based version of the information corresponding to the exit bookmark or exit location within the electronic text-based version of the information where the user exited the electronic text-based version of the information.

In one embodiment, at THE USER ACCESSES THE AUDIO-BASED VERSION OF THE INFORMATION AND IS BROUGHT TO THE MAPPED CORRESPONDING FIRST LOCATION IN THE AUDIO-BASED VERSION AND/OR IS PROVIDED THE AUDIO-BASED USER INPUT DATA OPERATION 313 the user accesses the audio-based version of the information of PROVIDE INFORMATION TO USERS IN AN ELECTRONIC TEXT-BASED VERSION AND AN AUDIO-BASED VERSION OPERATION 303 via a user computing system that includes, can access, and/or is associated with, the multi-media monitoring, mapping, and synchronization interface and/or at least one of the two or more media versions of the information.

In one embodiment, at THE USER ACCESSES THE AUDIO-BASED VERSION OF THE INFORMATION AND IS BROUGHT TO THE MAPPED CORRESPONDING FIRST LOCATION IN THE AUDIO-BASED VERSION AND/OR IS PROVIDED THE AUDIO-BASED USER INPUT DATA OPERATION 313 the user accesses the audio-based version of the information via a user computing system that is the same as the user computing system used to access the electronic text-based version of the information.

In one embodiment, at THE USER ACCESSES THE AUDIO-BASED VERSION OF THE INFORMATION AND IS BROUGHT TO THE MAPPED CORRESPONDING FIRST LOCATION IN THE AUDIO-BASED VERSION AND/OR IS PROVIDED THE AUDIO-BASED USER INPUT DATA OPERATION 313 the user accesses the audio-based version of the information via a user computing system that is different from the user computing system used to access the electronic text-based version of the information, e.g., an audio playback system such as an IPod or MP3 player.

As noted above, by mapping the exit bookmark or exit location within the electronic text-based version of the information where the user exited the electronic text-based version of the information to a corresponding begin playback location in the audio-based version of the information at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309, when the user accesses the audio-based version of the information through the multi-media monitoring, mapping, and synchronization interface, at THE USER ACCESSES THE AUDIO-BASED VERSION OF THE INFORMATION AND IS BROUGHT TO THE MAPPED CORRESPONDING FIRST LOCATION IN THE AUDIO-BASED VERSION AND/OR IS PROVIDED THE AUDIO-BASED USER INPUT DATA OPERATION 313, the user is automatically taken to the mapped begin playback location in the audio-based version of the information corresponding to the exit bookmark or exit location in the electronic text-based version of the information where the user discontinued using the electronic text-based version of the information.

In one embodiment, once the user accesses the audio-based version of the information of PROVIDE INFORMATION TO USERS IN AN ELECTRONIC TEXT-BASED VERSION AND AN AUDIO-BASED VERSION OPERATION 303 and is automatically sent to the begin playback location in the audio-based version of the information corresponding to the exit bookmark or exit location within the electronic text-based version of the information where the user exited the electronic text-based version of the information at THE USER ACCESSES THE AUDIO-BASED VERSION OF THE INFORMATION AND IS BROUGHT TO THE MAPPED CORRESPONDING FIRST LOCATION IN THE AUDIO-BASED VERSION AND/OR IS PROVIDED THE AUDIO-BASED USER INPUT DATA OPERATION 313, process flow proceeds to THE USER PROVIDES AUDIO-BASED USER INPUT DATA ASSOCIATED WITH A SECOND LOCATION IN THE AUDIO-BASED VERSION OF THE INFORMATION OPERATION 315.

In one embodiment, at THE USER PROVIDES AUDIO-BASED USER INPUT DATA ASSOCIATED WITH A SECOND LOCATION IN THE AUDIO-BASED VERSION OF THE INFORMATION OPERATION 315 the user performs one or more activities and/or actions within, or through, the audio-based version of the information of PROVIDE INFORMATION TO USERS IN AN ELECTRONIC TEXT-BASED VERSION AND AN AUDIO-BASED VERSION OPERATION 303.

In one embodiment, the activities and/or actions the user performs within the audio-based version of the information at THE USER PROVIDES AUDIO-BASED USER INPUT DATA ASSOCIATED WITH A SECOND LOCATION IN THE AUDIO-BASED VERSION OF THE INFORMATION OPERATION 315 include, but are not limited to, listening to, or playing back, a portion of the audio-based version of the information and/or any or all of the activities and/or actions discussed above with respect to A USER ACCESSES THE ELECTRONIC TEXT-BASED VERSION OF THE INFORMATION AND PROVIDES ELECTRONIC TEXT-BASED USER INPUT DATA ASSOCIATED WITH A FIRST LOCATION IN THE ELECTRONIC TEXT-BASED VERSION OF THE INFORMATION OPERATION 307 and the electronic text-based version of the information.

In one embodiment, at THE USER PROVIDES AUDIO-BASED USER INPUT DATA ASSOCIATED WITH A SECOND LOCATION IN THE AUDIO-BASED VERSION OF THE INFORMATION OPERATION 315 when the user finishes utilizing, and/or accessing, the audio-based version of the information, the end playback location within the audio-based version of the information where the user exited the audio-based version of the information, or otherwise stopped utilizing the audio-based version of the information, is obtained and recorded, in one embodiment, by the multi-media monitoring, mapping, and synchronization interface.

In one embodiment, at THE USER PROVIDES AUDIO-BASED USER INPUT DATA ASSOCIATED WITH A SECOND LOCATION IN THE AUDIO-BASED VERSION OF THE INFORMATION OPERATION 315 the end playback location within the audio-based version of the information is recorded by the user verbally indicating a bookmark or exit location or through user action such as the user activating a stop, bookmark, or pause feature.

In one embodiment, at THE USER PROVIDES AUDIO-BASED USER INPUT DATA ASSOCIATED WITH A SECOND LOCATION IN THE AUDIO-BASED VERSION OF THE INFORMATION OPERATION 315 the end playback location within the audio-based version of the information is recorded automatically when the user exits, or otherwise ends access to the audio-based version of the information, by determining the playback location when the user ended access.

In one embodiment, at THE USER PROVIDES AUDIO-BASED USER INPUT DATA ASSOCIATED WITH A SECOND LOCATION IN THE AUDIO-BASED VERSION OF THE INFORMATION OPERATION 315 the end playback location within the audio-based version of the information is determined by any method, means, process or procedure for determining a location within the audio-based version of the information as discussed herein, and/or as known in the art at the time of filing, and/or as developed after the time of filing.

In one embodiment, at THE USER PROVIDES AUDIO-BASED USER INPUT DATA ASSOCIATED WITH A SECOND LOCATION IN THE AUDIO-BASED VERSION OF THE INFORMATION OPERATION 315, the activities and/or actions the user performs within the audio-based version of the information can also include any of the data entry actions discussed above with respect to the electronic text-based version of the information.

In one embodiment, at THE USER PROVIDES AUDIO-BASED USER INPUT DATA ASSOCIATED WITH A SECOND LOCATION IN THE AUDIO-BASED VERSION OF THE INFORMATION OPERATION 315 the location within the audio-based version of the information associated with the activities and/or actions the user performs within the audio-based version of the information are recorded, in one embodiment, by the multi-media monitoring, mapping, and synchronization interface.

In one embodiment, once the user performs one or more activities and/or actions within, or through, the audio-based version of the information of PROVIDE INFORMATION TO USERS IN AN ELECTRONIC TEXT-BASED VERSION AND AN AUDIO-BASED VERSION OPERATION 303 at THE USER PROVIDES AUDIO-BASED USER INPUT DATA ASSOCIATED WITH A SECOND LOCATION IN THE AUDIO-BASED VERSION OF THE INFORMATION OPERATION 315, process flow proceeds to THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317.

In one embodiment, at THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317 data indicating the location, or locations, within the audio-based version of the information associated with the activities and/or actions performed by the user are obtained by the multi-media monitoring, mapping, and synchronization interface and mapped to a corresponding location, or locations, within the electronic text-based version of the information by the multi-media monitoring, mapping, and synchronization interface.

In one embodiment, at THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317 the end playback location within the audio-based version of the information where the user exited the audio-based version of the information is mapped to a corresponding new begin/return location in the electronic text-based version of the information by the multi-media monitoring, mapping, and synchronization interface. As discussed below, in this way, when the user accesses the electronic text-based version of the information through the multi-media monitoring, mapping, and synchronization interface, the user is automatically taken to the mapped new begin/return location in the electronic text-based version of the information corresponding to the end playback location in the audio-based version of the information where the user discontinued using the audio-based version of the information.

In addition, in one embodiment, at THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317 data indicating and/or associated with the user data entry actions in the audio-based version of the information is obtained by the multi-media monitoring, mapping, and synchronization interface.

In one embodiment, once data indicating the location, or locations, within the audio-based version of the information associated with the activities and/or actions performed by the user obtained by the multi-media monitoring, mapping, and synchronization interface and mapped to a corresponding location, or locations, within the electronic text-based version of the information by the multi-media monitoring, mapping, and synchronization interface at THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317 process flow proceeds to THE AUDIO-BASED USER INPUT DATA IS TRANSFORMED INTO TEXT BASED USER INPUT DATA AND/OR ASSOCIATED WITH THE MAPPED CORRESPONDING SECOND LOCATION IN THE TEXT-BASED VERSION OF THE INFORMATION OPERATION 319.

In one embodiment, at THE AUDIO-BASED USER INPUT DATA IS TRANSFORMED INTO TEXT BASED USER INPUT DATA AND/OR ASSOCIATED WITH THE MAPPED CORRESPONDING SECOND LOCATION IN THE TEXT-BASED VERSION OF THE INFORMATION OPERATION 319 the user data entry actions/data in the audio-based version of the information of THE USER PROVIDES AUDIO-BASED USER INPUT DATA ASSOCIATED WITH A SECOND LOCATION IN THE AUDIO-BASED VERSION OF THE INFORMATION OPERATION 315 are transformed into user data entry actions/data in the electronic text-based version of the information.

For instance, user notes made by audio data entry, or other means, in an audio-based version of the information at THE USER PROVIDES AUDIO-BASED USER INPUT DATA ASSOCIATED WITH A SECOND LOCATION IN THE AUDIO-BASED VERSION OF THE INFORMATION OPERATION 315 are transformed into electronic text-based notes in the electronic text-based version of the information at THE AUDIO-BASED USER INPUT DATA IS TRANSFORMED INTO TEXT BASED USER INPUT DATA AND/OR ASSOCIATED WITH THE MAPPED CORRESPONDING SECOND LOCATION IN THE TEXT-BASED VERSION OF THE INFORMATION OPERATION 319.

As noted above, in one embodiment, at THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317 data indicating the data input location, or locations, within the audio-based version of the information associated with the user data entry actions/data in the audio-based version of the information are mapped to a corresponding data insert location, or locations, within the electronic text-based version of the information by the multi-media monitoring, mapping, and synchronization interface. Consequently, In one embodiment, the data indicating and/or associated with the user data entry actions in the audio-based version of the information is transformed into user data entry actions/data in the electronic text-based version of the information and then entered into the electronic text-based version of the information at the appropriate location at THE AUDIO-BASED USER INPUT DATA IS TRANSFORMED INTO TEXT BASED USER INPUT DATA AND/OR ASSOCIATED WITH THE MAPPED CORRESPONDING SECOND LOCATION IN THE TEXT-BASED VERSION OF THE INFORMATION OPERATION 319.

For instance, user notes made by audio data entry, or other means, directed to chapter 1, paragraph 6, in an electronic text-based version of a textbook at THE USER PROVIDES AUDIO-BASED USER INPUT DATA ASSOCIATED WITH A SECOND LOCATION IN THE AUDIO-BASED VERSION OF THE INFORMATION OPERATION 315 are transformed into electronic text-based data and inserted at chapter 1, paragraph 6, in the electronic text-based data version of the information at THE AUDIO-BASED USER INPUT DATA IS TRANSFORMED INTO TEXT BASED USER INPUT DATA AND/OR ASSOCIATED WITH THE MAPPED CORRESPONDING SECOND LOCATION IN THE TEXT-BASED VERSION OF THE INFORMATION OPERATION 319.

In one embodiment, once the user data entry actions/data in the audio-based version of the information of THE USER PROVIDES AUDIO-BASED USER INPUT DATA ASSOCIATED WITH A SECOND LOCATION IN THE AUDIO-BASED VERSION OF THE INFORMATION OPERATION 315 are transformed into user data entry actions/data in the electronic text-based version of the information at THE AUDIO-BASED USER INPUT DATA IS TRANSFORMED INTO TEXT BASED USER INPUT DATA AND/OR ASSOCIATED WITH THE MAPPED CORRESPONDING SECOND LOCATION IN THE TEXT-BASED VERSION OF THE INFORMATION OPERATION 319, process flow proceeds to THE USER ACCESSES THE ELECTRONIC TEXT-BASED VERSION OF THE INFORMATION AND IS BROUGHT TO THE MAPPED CORRESPONDING SECOND LOCATION IN THE ELECTRONIC TEXT-BASED VERSION OF THE INFORMATION AND/OR IS PROVIDED THE ELECTRONIC TEXT-BASED USER INPUT DATA OPERATION 321.

In one embodiment, at THE USER ACCESSES THE ELECTRONIC TEXT-BASED VERSION OF THE INFORMATION AND IS BROUGHT TO THE MAPPED CORRESPONDING SECOND LOCATION IN THE ELECTRONIC TEXT-BASED VERSION OF THE INFORMATION AND/OR IS PROVIDED THE ELECTRONIC TEXT-BASED USER INPUT DATA OPERATION 321 the user returns to the electronic text-based version of the information of PROVIDE INFORMATION TO USERS IN AN ELECTRONIC TEXT-BASED VERSION AND AN AUDIO-BASED VERSION OPERATION 303 and is automatically sent to the new begin/return location in the electronic text-based version of the information corresponding to the end playback location within the audio-based version of the information where the user exited the audio-based version of the information.

In various embodiments, the process described above is repeated each time a user accesses either the electronic text-based version or the audio-based version of the information.

As noted above, by mapping the exit location within a given media version of the information where the user exited the given media version of the information to a corresponding begin location in the other media version of the information at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309 or THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317, when the user accesses either media version of the information through the multi-media monitoring, mapping, and synchronization interface, the user is automatically taken to the mapped begin location in that media version of the information corresponding to the exit location in the other media version of the information last used.

In addition, in one embodiment, data indicating the data input location, or locations, within either media version of the information associated with the user data entry actions/data in either media version of the information are mapped to corresponding data insert location, or locations, within either media version of the information by at THE FIRST LOCATION IN THE ELECTRONIC TEXT-BASED VERSION OF THE INFORMATION IS RECORDED AND MAPPED TO A CORRESPONDING FIRST LOCATION IN THE AUDIO-BASED VERSION OF THE INFORMATION OPERATION 309 and/or THE SECOND LOCATION IN THE AUDIO-BASED VERSION OF THE INFORMATION IS RECORDED AND MAPPED TO A CORRESPONDING SECOND LOCATION IN THE ELECTRONIC TEXT-BASED VERSION OF THE INFORMATION OPERATION 317 and transformed into both media version formats at THE ELECTRONIC TEXT-BASED USER INPUT DATA IS TRANSFORMED INTO AUDIO-BASED USER INPUT DATA AND/OR ASSOCIATED WITH THE MAPPED CORRESPONDING FIRST LOCATION IN THE AUDIO-BASED VERSION OF THE INFORMATION OPERATION 311 and/or THE AUDIO-BASED USER INPUT DATA IS TRANSFORMED INTO TEXT BASED USER INPUT DATA AND/OR ASSOCIATED WITH THE MAPPED CORRESPONDING SECOND LOCATION IN THE TEXT-BASED VERSION OF THE INFORMATION OPERATION 319.

Using process for synchronizing activity in electronic text-based and audio-based versions of the same information 300, a user is provided access to both electronic text-based and audio-based versions of information through a single multi-media monitoring, mapping, and synchronization interface. The user's activity in either the electronic text-based or audio-based version of the information is then monitored and mapped to the other media version of information and the electronic text-based and audio-based versions are synchronized. Consequently using process for synchronizing activity in electronic text-based and audio-based versions of the same information 300, a user can transfer between electronic text-based or audio-based version versions of the same information easily and relatively seamlessly so that the information can be accessed and utilized in either the electronic text-based or audio-based version efficiently and effectively without significant user action and at the appropriate location in either media version.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols.

Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "calculating", "capturing", "categorizing", "classifying", "comparing", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations.

In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet, or a cloud.

Therefore, numerous variations, whether explicitly provided for by the specification or implied by the specification or not, may be implemented by one of skill in the art in view of this disclosure.

What is claimed is:

1. A system for synchronizing activity in electronic text-based and audio-based versions of the same information comprising:

one or more microprocessors associated with one or more computing systems, the one or more microprocessors associated with one or more computing systems implementing at least part of a process for synchronizing activity in two or more media versions of the same information, the process for synchronizing activity in two or more media versions of the same information including:

creating, using the one or more microprocessors associated with one or more computing systems, an electronic text-based version and an audio-based version of the same information;

providing, using the one or more microprocessors associated with one or more computing systems, a multi-media monitoring, mapping, and synchronization interface;

providing, using the one or more microprocessors associated with one or more computing systems, a user access to a first one of the electronic text-based version or audio-based version of the information through the multi-media monitoring, mapping, and synchronization interface;

monitoring, using the one or more microprocessors associated with one or more computing systems, the user's utilization of the first one of the electronic text-based version or audio-based version of the information through the multi-media monitoring, mapping, and synchronization interface;

obtaining, using the one or more microprocessors associated with one or more computing systems, first media version exit location data indicating a location in the first one of the electronic text-based version or audio-based version of the information where the user stopped utilizing the first one of the electronic text-based version or audio-based version of the information;

mapping, using the one or more microprocessors associated with one or more computing systems, the first media version exit location data of the first one of the electronic text-based version or audio-based version of the information to a corresponding location in a second one of the electronic text-based version or audio-based version of the information and designating the corresponding location in the second one of the electronic text-based version or audio-based version of the information a second media version begin location for the second one of the electronic text-based version or audio-based version of the information;

the user accessing, using the one or more microprocessors associated with one or more computing systems, the second one of the electronic text-based version or audio-based version of the information through the multi-media monitoring, mapping, and synchronization interface; and providing, using the one or more microprocessors associated with one or more computing systems, the user access to the second one of the electronic text-based version or audio-based version of the information at the begin location for the second one of the electronic text-based version or audio-based version of the information corresponding to the first media version exit location of the first one of the electronic text-based version or audio-based version of the information.

2. A system for synchronizing activity in two or more media versions of the same information comprising:

two or more media versions of the same information, the two or more media versions of the same information each being created in a different media format, the two or more media versions of the same information including at least two of an audio-based version of the information, a video-based version of the information, and an electronic text-based version of the information;

a multi-media monitoring, mapping, and synchronization interface; and one or more microprocessors associated with one or more computing systems, the one or more microprocessors associated with one or more computing systems implementing at least part of a process for synchronizing activity in two or more media versions of the same information, the process for synchronizing activity in two or more media versions of the same information including:

using the one or more microprocessors associated with one or more computing systems to provide a user access to a first media version of the information through the multi-media monitoring, mapping, and synchronization interface;

using the one or more microprocessors associated with one or more computing systems to monitor the user's utilization of the first media version of the information through the multi-media monitoring, mapping, and synchronization interface;

using the one or more microprocessors associated with one or more computing systems to obtain first media version exit location data indicating a location in the first media version of the information where the user stopped utilizing the first media version of the information;

using the one or more microprocessors associated with one or more computing systems to map the first media version exit location data to a corresponding location in a second media version of the information and designating the corresponding location in the second media version of the information a second media version begin location for the second media version of the information;

the user accessing the second media version of the information through the multi-media monitoring, mapping, and synchronization interface; and using the one or more microprocessors associated with one or more computing systems to provide the user access to the second media version of the information at the begin location for the second media version of the information corresponding to the first media version exit location in the first media version of the information.

3. The system for synchronizing activity in two or more media versions of the same information of claim 2, wherein;
the two or more media versions of the same information include an electronic text-based version of the information and an audio-based version of the information.

4. The system for synchronizing activity in two or more media versions of the same information of claim 2, wherein;
the two or more media versions of the same information include an electronic text-based version of the information and a video-based version of the information.

5. The system for synchronizing activity in two or more media versions of the same information of claim 2, wherein;
the two or more media versions of the same information include an audio-based version of the information and a video-based version of the information.

6. The system for synchronizing activity in two or more media versions of the same information of claim 2, wherein;
the two or more media versions of the same information include an audio-based version of the information, a video-based version of the information, and an electronic text-based version of the information.

7. A system for synchronizing activity in two or more media versions of the same information comprising:

two or more media versions of the same information, the two or more media versions of the same information each being created in a different media format, the two or more media versions of the same information including at least two of an audio-based version of the information, a video-based version of the information, and an electronic text-based version of the information;

a multi-media monitoring, mapping, and synchronization interface; and one or more microprocessors associated with one or more computing systems, the one or more microprocessors associated with one or more computing systems implementing a process for synchronizing activity in two or more media versions of the same information, the process for synchronizing activity in two or more media versions of the same information including:

using the one or more microprocessors associated with one or more computing systems to provide a user access to a first media version of the information through the multi-media monitoring, mapping, and synchronization interface;

using the one or more microprocessors associated with one or more computing systems to monitor the user's utilization of the first media version of the information through the multi-media monitoring, mapping, and synchronization interface;

using the one or more microprocessors associated with one or more computing systems to obtain first media version user input data representing one or more user input actions in the first media version of the information;

using the one or more microprocessors associated with one or more computing systems to obtain first media version user input location data indicating a user data input location in the first media version of the information corresponding to the place in the first media version of the information where the user input data was entered;

using the one or more microprocessors associated with one or more computing systems to obtain first media version exit location data indicating a location in the first media version of the information where the user stopped utilizing the first media version of the information;

using the one or more microprocessors associated with one or more computing systems to map the first media version exit location data to a corresponding location in a second media version of the information and designating the corresponding location in the second media version of the information a second media version begin location for the second media version of the information;

using the one or more microprocessors associated with one or more computing systems to map the first media version user input location to a corresponding location in the second media version of the information and designating the corresponding location in the second media version of the information a second media version user data input location for the second media version of the information;

using the one or more microprocessors associated with one or more computing systems to transform the first media version user input data into second media version user input data in the media format of the second media version of the information;

the user accessing the second media version of the information through the multi-media monitoring, mapping, and synchronization interface;

using the one or more microprocessors associated with one or more computing systems to provide the user access to the second media version of the information at the begin location for the second media version of the information corresponding to the first media version exit location; and using the one or more microprocessors associated with one or more computing systems to insert the second media version user input data in the media format of the second media version of the information at the second media version user input location for the second media version of the information.

8. The system for synchronizing activity in two or more media versions of the same information of claim 7, wherein;
the two or more media versions of the same information include an electronic text-based version of the information and an audio-based version of the information.

9. The system for synchronizing activity in two or more media versions of the same information of claim 7, wherein;
the two or more media versions of the same information include an electronic text-based version of the information and a video-based version of the information.

10. The system for synchronizing activity in two or more media versions of the same information of claim 7, wherein;
the two or more media versions of the same information include an audio-based version of the information and a video-based version of the information.

11. The system for synchronizing activity in two or more media versions of the same information of claim 7, wherein;
the two or more media versions of the same information include an audio-based version of the information, a video-based version of the information, and an electronic text-based version of the information.

12. The system for synchronizing activity in two or more media versions of the same information of claim 7, wherein;
the first media version user input data includes data representing a definition of a word in the first media version of the information.

13. The system for synchronizing activity in two or more media versions of the same information of claim 7, wherein;
the first media version user input data includes data representing user notes in the first media version of the information.

14. The system for synchronizing activity in two or more media versions of the same information of claim 7, wherein;
the first media version user input data includes data representing user bookmarks and/or highlights in the first media version of the information.

15. A system for synchronizing activity in electronic text-based and audio-based versions of the same information comprising:

an electronic text-based version and an audio-based version of the same information;

a multi-media monitoring, mapping, and synchronization interface; and one or more microprocessors associated with one or more computing systems, the one or more microprocessors associated with one or more computing systems implementing a process for synchronizing activity in two or more media versions of the same information, the process for synchronizing activity in two or more media versions of the same information including:

using the one or more microprocessors associated with one or more computing systems to provide a user access to a first one of the electronic text-based version or audio-based version of the information through the multi-media monitoring, mapping, and synchronization interface;

using the one or more microprocessors associated with one or more computing systems to monitor the user's utilization of the first one of the electronic text-based version or audio-based version of the information through the multi-media monitoring, mapping, and synchronization interface;

using the one or more microprocessors associated with one or more computing systems to obtain first media version exit location data indicating a location in the first one of the electronic text-based version or audio-based version of the information where the user stopped utilizing the first one of the electronic text-based version or audio-based version of the information;

using the one or more microprocessors associated with one or more computing systems to map the first media version exit location data of the first one of the electronic text-based version or audio-based version of the information to a corresponding location in a second one of the electronic text-based version or audio-based version of the information and designating the corresponding location in the second one of the electronic text-based version or audio-based version of the information a second media version begin location for the second one of the electronic text-based version or audio-based version of the information;

the user accessing the second one of the electronic text-based version or audio-based version of the information through the multi-media monitoring, mapping, and synchronization interface; and using the one or more microprocessors associated with one or more computing systems to provide the user access to the second one of the electronic text-based version or audio-based version of the information at the begin location for the second one of the electronic text-based version or audio-based version of the information corresponding to the first media version exit location of the first one of the electronic text-based version or audio-based version of the information.

16. A system for synchronizing activity in electronic text-based and audio-based versions of the same information comprising:

one or more microprocessors associated with one or more computing systems, the one or more microprocessors associated with one or more computing systems implementing a process for synchronizing activity in two or more media versions of the same information, the process for synchronizing activity in two or more media versions of the same information including:

creating, using the one or more microprocessors associated with one or more computing systems, an electronic text-based version and an audio-based version of the same information;

providing, using the one or more microprocessors associated with one or more computing systems, a multi-media monitoring, mapping, and synchronization interface;

providing, using the one or more microprocessors associated with a first computing system, a user access to a first one of the electronic text-based version or audio-based version of the information through the multi-media monitoring, mapping, and synchronization interface;

monitoring, using the one or more microprocessors associated with one or more computing systems, the user's utilization of the first one of the electronic text-based version or audio-based version of the information through the multi-media monitoring, mapping, and synchronization interface;

obtaining, using the one or more microprocessors associated with one or more computing systems, first media version user input data representing one or more user input actions in the first one of the electronic text-based version or audio-based version of the information;

obtaining, using the one or more microprocessors associated with one or more computing systems, first media version user input location data indicating a user data input location in the first one of the electronic text-based version or audio-based version of the information corresponding to the place in the first one of the electronic text-based version or audio-based version of the information where the user input data was entered;

obtaining, using the one or more microprocessors associated with one or more computing systems, first media version exit location data indicating a location in the first one of the electronic text-based version or audio-based version of the information where the user stopped utilizing the first one of the electronic text-based version or audio-based version of the information;

mapping, using the one or more microprocessors associated with one or more computing systems, the first media version exit location data of the first one of the electronic text-based version or audio-based version of the information to a corresponding location in a second one of the electronic text-based version or audio-based version of the information and designating the corresponding location in the second one of the electronic text-based version or audio-based version of the information a second media version begin location for the second media version of the information;

mapping, using the one or more microprocessors associated with one or more computing systems, the first media version user input location to a corresponding location in the second one of the electronic text-based version or audio-based version of the information and designating the corresponding location in the second one of the electronic text-based version or audio-based version of the information a second media version user input location for the second one of the electronic text-based version or audio-based version of the information;

transforming, using the one or more microprocessors associated with one or more computing systems, the first media version user input data into second media version user input data in the media format of the second one of the electronic text-based version or audio-based version of the information;

the user accessing the second one of the electronic text-based version or audio-based version of the information through the multi-media monitoring, mapping, and synchronization interface;

providing, using the one or more microprocessors associated with a second computing system, the user access to the second one of the electronic text-based version or audio-based version of the information at the begin location for the second one of the electronic text-based version or audio-based version of the information corresponding to the first media version exit location of the first one of the electronic text-based version or audio-based version of the information; and inserting, using the one or more microprocessors associated with one or more computing systems, the second media version user input data in the media format of the second one of the electronic text-based version or audio-based version of the information at the second media version user input location for the second one of the electronic text-based version or audio-based version of the information.

17. The system for synchronizing activity in electronic text-based and audio-based versions of the same information of claim 16, wherein;

the user input data includes data representing a definition of a word.

18. The system for synchronizing activity in electronic text-based and audio-based versions of the same information of claim 16, wherein;

the user input data includes data representing user notes.

19. The system for synchronizing activity in electronic text-based and audio-based versions of the same information of claim 16, wherein;

the user input data includes data representing user bookmarks and/or highlights.

* * * * *